US011407426B2

(12) United States Patent
Hua et al.

(10) Patent No.: US 11,407,426 B2
(45) Date of Patent: Aug. 9, 2022

(54) COLLISION WARNING METHOD AND APPARATUS

(71) Applicant: HUAWEI TECHNOLOGIES CO., LTD., Guangdong (CN)

(72) Inventors: Fei Hua, Shanghai (CN); Haishan Sun, Shanghai (CN); Wei Huang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 174 days.

(21) Appl. No.: 16/874,172

(22) Filed: May 14, 2020

(65) Prior Publication Data
US 2020/0269867 A1 Aug. 27, 2020

Related U.S. Application Data

(63) Continuation of application No. PCT/CN2018/111281, filed on Oct. 22, 2018.

(30) Foreign Application Priority Data

Nov. 16, 2017 (CN) .......................... 201711138409.X

(51) Int. Cl.
*B60W 50/14* (2020.01)
*B60W 10/18* (2012.01)
(Continued)

(52) U.S. Cl.
CPC ............ *B60W 50/14* (2013.01); *B60W 10/18* (2013.01); *B60W 30/0953* (2013.01);
(Continued)

(58) Field of Classification Search
CPC ...... B60T 17/22; B60T 2201/022; B60T 7/22; B60W 10/18; B60W 2040/0872;
(Continued)

(56) References Cited

U.S. PATENT DOCUMENTS

2005/0168328 A1* 8/2005 Kitterer ................ B60K 31/107
340/435
2015/0025784 A1* 1/2015 Kastner ............. B60W 30/0953
701/119
(Continued)

FOREIGN PATENT DOCUMENTS

CN 101183493 A 5/2008
CN 101510097 A 8/2009
(Continued)

OTHER PUBLICATIONS

Haoran Wu,"Forward Collision Warning Algorithm Based on Driving Intention and Driving Environment",Wuhan University of Technology, Control Science and Engineering, 2013,total 74 pages.
(Continued)

*Primary Examiner* — Babar Sarwar
(74) *Attorney, Agent, or Firm* — Womble Bond Dickinson (US) LLP

(57) ABSTRACT

A collision warning method and a collision warning apparatus are disclosed. The method includes: obtaining a target deceleration and a target distance headway of a first vehicle by training based on historical travel data of the first vehicle, obtaining a TTC of the first vehicle and a leading vehicle, and determining, based on a comparison between the TTC and a first threshold, whether to send warning information. Because the target deceleration and the target distance headway of the first vehicle can reflect personal driving habit characteristics of a driver of the first vehicle, the TTC obtained based on the historical travel data is highly adaptable, thereby effectively resolving a problem of low warning effectiveness that is caused by a unified deceleration and a unified distance headway in the prior art.

20 Claims, 11 Drawing Sheets

(51) Int. Cl.
  *B60W 30/095* (2012.01)
  *B60W 40/09* (2012.01)
  *B60W 40/08* (2012.01)
(52) U.S. Cl.
  CPC ..... *B60W 40/09* (2013.01); *B60W 2040/0872* (2013.01); *B60W 2540/225* (2020.02); *B60W 2540/229* (2020.02); *B60W 2554/802* (2020.02); *B60W 2554/804* (2020.02); *B60W 2556/10* (2020.02)
(58) Field of Classification Search
  CPC ..... B60W 2540/221; B60W 2540/225; B60W 2540/229; B60W 2554/802; B60W 2554/804; B60W 2556/10; B60W 30/09; B60W 30/095; B60W 30/0953; B60W 40/08; B60W 40/09; B60W 50/14; G08G 1/16
  See application file for complete search history.

(56) References Cited

U.S. PATENT DOCUMENTS

| | | | |
|---|---|---|---|
| 2016/0240084 A1* | 8/2016 | Takeuchi | B60T 17/22 |
| 2016/0264108 A1* | 9/2016 | Harada | B60T 7/22 |
| 2017/0355377 A1* | 12/2017 | Vijaya Kumar | B60W 40/08 |

FOREIGN PATENT DOCUMENTS

| | | | | |
|---|---|---|---|---|
| CN | 101727757 A | 6/2010 | | |
| CN | 102745194 A | 10/2012 | | |
| CN | 103531042 A | 1/2014 | | |
| CN | 103842230 A | 6/2014 | | |
| CN | 103930937 A | 7/2014 | | |
| CN | 105761548 A | 7/2016 | | |
| CN | 105788360 A | 7/2016 | | |
| CN | 106240458 A | 12/2016 | | |
| CN | 107346612 A | 11/2017 | | |
| CN | 107346612 A * | 11/2017 | | |
| DE | 102011111855 A1 | 2/2013 | | |
| EP | 2174838 A1 * | 4/2010 | | B60K 35/00 |
| EP | 2179897 A1 * | 4/2010 | | B60W 40/09 |
| GB | 2488238 A | 8/2012 | | |
| JP | 2017030435 A | 2/2017 | | |
| WO | WO-2016150088 A1 * | 9/2016 | | H04B 10/116 |
| WO | 2016186175 A1 | 11/2016 | | |

OTHER PUBLICATIONS

Haoran Wu,"Forward Collision Warning Algorithm Based on Driving Intention and Driving Environment",dated Dec. 15, 2013,total 74 pages.

Na Lin et al.,"An Overview on Study of Identification of Driver Behavior Characteristics for Automotive Control",Hindawi Publishing Corporation Mathematical Problems in Engineering,dated Mar. 17, 2014,total 16 pages.

JianqiangWang et al.,"A Forward Collision Warning Algorithm With Adaptation to Driver Behaviors",IEEE Transactions on Intelligent Transportation Systems, vol. 17, No. 4, Apr. 2016,total 11 pages.

Mingyuan Bian et al.,"A Modified Vehicle Safety Distance Model Adapting to Driver Individual Characteristics",Chinese Journal of Mechanical Engineering,dated Jun. 2010,total 15 pages.

Yuanzhi Hu et al.,"Algorithm and simulation verification of longitudinal collision avoidance for autonomous emergency break (AEB) system based on PreScan",J Automotive Safety and Energy, vol. 8 No. 2, 2017,total 10 pages.

* cited by examiner ness that is caused by a unified warning manner in the prior art.

COLLISION WARNING METHOD AND APPARATUS

CROSS-REFERENCE TO RELATED APPLICATIONS

This application is a continuation of International Patent Application No. PCT/CN2018/111281, filed on Oct. 22, 2018, which claims priority to Chinese Patent Application No. 201711138409.X, filed on Nov. 16, 2017. The disclosures of the aforementioned applications are hereby incorporated by reference in their entireties.

TECHNICAL FIELD

The present invention relates to the field of computer application technologies, and in particular, to a collision warning method and apparatus.

BACKGROUND

Rapid development of the global economy leads to a soaring quantity of vehicles. With more roads constructed, vehicle collision accidents on the roads are on the rise. To avoid vehicle collision accidents, almost all mainstream vehicle manufacturers and technology suppliers provide a forward collision warning (FCW) system and an automatic emergency braking (AEB) system.

Primarily by monitoring in real time a leading vehicle and obtaining a longitudinal distance between a subject vehicle and the leading vehicle and speeds of the vehicles, the FCW system calculates a time to collision based on unified driver maneuver ability, outputs a warning signal to make a driver aware of danger, and recommends a danger avoidance action. The AEB system works when the driver fails to take the danger avoidance action in time, to avoid a vehicle collision accident by automatically taking an evasive action.

In the prior art, the FCW system generally applies a standard deceleration and distance headway, and obtains a 2.7-second warning time ahead of collision based on a statistic model. However, because different drivers have different driving styles and driving habits, the unified warning manner may result in a too early warning that causes interference to the driver, or a too late warning that makes the warning ineffective.

Therefore, currently, a collision warning method is urgently needed to resolve a technical problem of low warning effectiveness that is caused by a unified warning manner in the prior art.

SUMMARY

This application provides a method to resolve a technical problem of low warning effectiveness that is caused by a unified deceleration and distance headway in the prior art.

According to a first aspect, this application provides a collision warning method. The method includes:

obtaining a target deceleration and a target distance headway of a first vehicle, where the target deceleration and the target distance headway of the first vehicle are obtained through training based on historical travel data of the first vehicle, and the historical travel data of the first vehicle includes decelerations in a plurality of braking processes and distance headways of the first vehicle that correspond to a plurality of braking end moments;

obtaining a time to collision (TTC) of the first vehicle and a leading vehicle based on the target deceleration and the target distance headway; and sending warning information if it is determined that the TTC is less than or equal to a first threshold.

In this way, because the target deceleration and the target distance headway of the first vehicle can reflect personal driving habit characteristics of a driver of the first vehicle, the TTC obtained based on the historical travel data is highly adaptable, thereby effectively resolving the technical problem of low warning effectiveness that is caused by a unified deceleration and a unified distance headway in the prior art.

In one embodiment, the TTC of the first vehicle and the leading vehicle is obtained by using the following formulas:

$$\Delta t = \frac{-\Delta v + \sqrt{\Delta v^2 + 2\Delta a(D - DHW)}}{\Delta a}$$

$$\Delta v = Vh - Vd$$

$$\Delta a = ah - ad$$

where $\Delta t$ is the TTC of the first vehicle and the leading vehicle, D is an inter-vehicle distance between the first vehicle and the leading vehicle, DHW is the target distance headway of the first vehicle, $\Delta v$ is a relative speed of the first vehicle against the leading vehicle, Vh is a travel speed of the first vehicle, Vd is a travel speed of the leading vehicle, $\Delta a$ is a braking deceleration of the first vehicle against the leading vehicle, ah is the target deceleration of the first vehicle, and ad is a target deceleration of the leading vehicle.

In one embodiment, before it is determined that the TTC is less than or equal to a first threshold, the method further includes:

obtaining the first threshold based on any one or any combination of an attention recall time parameter, a reaction-to-reminder time parameter, and a braking time parameter of a driver of the first vehicle, where the attention recall time parameter of the driver of the first vehicle means a time required for engaging attention of the driver back from a preset state of the driver, where the preset state includes an inattentive state;

the reaction-to-reminder time parameter of the driver of the first vehicle means a time required for the driver to react after the warning information is sent when the driver has paid attention; and the braking time parameter of the driver of the first vehicle means a time required for the first vehicle to restore a safe state after the driver takes a braking action.

From the foregoing description, it can be learned that in determining the first threshold, any one or any combination of the attention recall time parameter, the reaction-to-reminder time parameter, and the braking time parameter of the driver of the first vehicle may be introduced, and the first threshold is determined based on the introduced parameter. Because any one of the parameters can effectively reflect personal characteristics of the driver, determining the first threshold based on any one of the foregoing parameters is more adaptable than the prior art in which a fixed value is uniformly used.

In one embodiment, the attention recall time parameter of the driver of the first vehicle is obtained in the following way:

obtaining driving behavior data of the driver at a current moment, where the driving behavior data includes any one or any combination of a limb behavior, a facial expression, and line-of-sight orientation information of the driver; and obtaining the attention recall time parameter of the driver of the first vehicle based on the driving behavior data.

From the foregoing description, it can be learned that the attention recall time parameter of the driver of the first vehicle is obtained based on driving behavior data of the driver at a current moment, and therefore, a correspondence between the attention recall time parameter of the driver and the current moment is ensured, and accuracy of the attention recall time parameter is effectively ensured.

In one embodiment, the obtaining the attention recall time parameter of the driver of the first vehicle based on the driving behavior data includes:

determining a status of the driver based on the driving behavior data, and obtaining, based on the status of the driver and a correspondence between the status and the attention recall time parameter, the attention recall time parameter corresponding to the status of the driver.

In one embodiment, the correspondence between the status and the attention recall time parameter is obtained through machine learning based on prepared historical driving behavior data and historical attention recall time parameters of a plurality of drivers.

In one embodiment, the historical travel data of the first vehicle further includes a plurality of historical reaction-to-reminder time parameters of the driver of the first vehicle;

the reaction-to-reminder time parameter of the driver of the first vehicle is obtained in the following way:

obtaining the reaction-to-reminder time parameter of the driver of the first vehicle based on the plurality of historical reaction-to-reminder time parameters.

In this way, the reaction-to-reminder time parameter of the driver of the first vehicle is obtained based on a plurality of historical reaction-to-reminder time parameters, and therefore, the reaction-to-reminder time parameter of the driver of the first vehicle can effectively reflect driving habits of the driver of the first vehicle.

In one embodiment, the obtaining the reaction-to-reminder time parameter of the driver of the first vehicle based on the plurality of historical reaction-to-reminder time parameters includes:

obtaining the reaction-to-reminder time parameter of the driver of the first vehicle in an iteration manner based on the plurality of historical reaction-to-reminder time parameters, where the iteration manner includes: determining a deviation between a reaction-to-reminder time parameter obtained in a previous iteration and a reaction-to-reminder time parameter for a current iteration, and updating the reaction-to-reminder time parameter to a reaction-to-reminder time for the current iteration and performing a next iteration, if a deviation rate is greater than a deviation rate threshold, or ending the iterations and obtaining the reaction-to-reminder time parameter of the driver of the first vehicle, if a deviation rate is less than or equal to the deviation rate threshold, where the reaction-to-reminder time parameter for each iteration is obtained based on at least one historical reaction-to-reminder time parameter.

In this way, a final result can be obtained through iterations based on historical reaction data of the driver, and therefore, accuracy of the result can be effectively ensured, and experience of the driver can be effectively improved.

In one embodiment, the historical travel data further includes a plurality of braking start moments, a plurality of braking end moments corresponding to the plurality of braking start moments, and TTC values of the plurality of braking start moments;

the braking time parameter of the driver of the first vehicle is obtained in the following way:

obtaining a plurality of braking cycles and braking occasions based on the historical travel data, where each of the braking cycles is a time length from a braking start moment to a braking end moment, and each of the braking occasions is a TTC corresponding to a braking start moment; and obtaining a target braking cycle and a target braking occasion based on the plurality of braking cycles and braking occasions, and obtaining the braking time parameter of the driver of the first vehicle based on the target braking cycle and the target braking occasion.

In this way, the braking time parameter of the driver of the first vehicle is obtained based on historical travel data, and therefore, the braking time parameter of the driver of the first vehicle can effectively reflect driving habits of the driver of the first vehicle.

In one embodiment, the braking time parameter of the driver of the first vehicle is obtained by using the following formula:

$$T3=Tb*Fs+Ts$$

where T3 is the braking time parameter of the driver of the first vehicle, Tb is the target braking cycle, Ts is the target braking occasion, and Fs is a preset safety parameter.

In one embodiment, the obtaining the first threshold based on any one or any combination of an attention recall time parameter, a reaction-to-reminder time parameter, and a braking time parameter of a driver of the first vehicle includes:

summing up the attention recall time parameter, the reaction-to-reminder time parameter, and the braking time parameter of the driver of the first vehicle to obtain the first threshold.

In one embodiment, the sending warning information if it is determined that the TTC is less than or equal to a first threshold includes:

sending the warning information at a first warning level if it is determined that the TTC is greater than a sum of the reaction-to-reminder time parameter and the braking time parameter and is less than or equal to the first threshold; or sending the warning information at a second warning level if it is determined that the TTC is greater than the braking time parameter and is less than or equal to a sum of the reaction-to-reminder time parameter and the braking time parameter, where the first warning level is lower than the second warning level in intensity of warning.

In this way, intensity of warning is determined based on a TTC value. If the TTC value is relatively small, it indicates relatively high urgency, and therefore, a relatively high intensity of warning may be used to remind the driver to take a braking action to avoid a collision effectively.

In one embodiment, before the sending warning information, the method further includes:

determining the status of the driver of the first vehicle and/or the line-of-sight orientation information of the driver, and determining, based on the status of the driver of the first vehicle and/or the line-of-sight orientation information of the driver, a manner of sending the warning information.

In one embodiment, the determining, based on the status of the driver of the first vehicle and/or the line-of-sight orientation information of the driver, a manner of sending the warning information includes:

determining, if it is determined that the driver of the first vehicle is in a fatigued state, that the manner of sending the warning information is a vibration mode; and/or determining, if it is determined that the line-of-sight orientation information of the driver indicates a direction other than a right-ahead direction, that the manner of sending the warning information is a voice mode and/or an enhanced display mode.

In this way, different warning manners are determined by considering the status and the line-of-sight orientation information of the driver, so that the warning manner better meets user needs.

In one embodiment, the target deceleration of the first vehicle is obtained through training in the following way:

selecting, among decelerations in a plurality of braking processes, a deceleration greater than a first threshold and less than a second threshold, and obtaining the target deceleration based on the selected deceleration; and the target distance headway of the first vehicle is obtained through training in the following way:

selecting, among distance headways of the first vehicle that correspond to the plurality of braking end moments, a distance headway greater than a third threshold and less than a fourth threshold, and obtaining the target distance headway based on the selected distance headway.

In this way, a large amount of historical data is filtered, and complexity of calculation can be effectively reduced. The filtering can effectively eliminate interfering data and improve accuracy of results.

This application further provides a method for determining an attention recall time parameter, including:

obtaining driving behavior data of a driver at a current moment, where the driving behavior data includes any one or any combination of a limb behavior, a facial expression, and line-of-sight orientation information of the driver; and obtaining an attention recall time parameter of the driver based on the driving behavior data.

In one embodiment, the obtaining an attention recall time parameter of the driver based on the driving behavior data includes:

determining a status of the driver based on the driving behavior data, and obtaining, based on the status of the driver and a correspondence between the status and the attention recall time parameter, the attention recall time parameter corresponding to the status of the driver.

In one embodiment, the correspondence between the status and the attention recall time parameter is obtained through machine learning based on prepared historical driving behavior data and historical attention recall time parameters of a plurality of drivers.

This application further provides a method for determining a reaction-to-reminder time parameter, including:

obtaining historical travel data of a driver, where the historical travel data includes a plurality of historical reaction-to-reminder time parameters; and obtaining a reaction-to-reminder time parameter of the driver based on the plurality of historical reaction-to-reminder time parameters.

In one embodiment, the obtaining a reaction-to-reminder time parameter of the driver based on the plurality of historical reaction-to-reminder time parameters includes:

obtaining the reaction-to-reminder time parameter of the driver of the first vehicle in an iteration manner based on the plurality of historical reaction-to-reminder time parameters, where the iteration manner includes: determining a deviation between a reaction-to-reminder time parameter obtained in a previous iteration and a reaction-to-reminder time parameter for a current iteration, and updating the reaction-to-reminder time parameter to a reaction-to-reminder time for the current iteration and performing a next iteration, if a deviation rate is greater than a deviation rate threshold, or ending the iterations and obtaining the reaction-to-reminder time parameter of the driver of the first vehicle, if a deviation rate is less than or equal to the deviation rate threshold, where the reaction-to-reminder time parameter for each iteration is obtained based on at least one historical reaction-to-reminder time parameter.

This application further provides a method for determining a braking time parameter, including:

obtaining historical travel data of the driver, where the historical travel data includes a plurality of braking start moments, a plurality of braking end moments corresponding to the plurality of braking start moments, and TTC values of the plurality of braking start moments;

obtaining a plurality of braking cycles and a plurality of braking occasions based on the historical travel data, where each of the braking cycles is a time length from a braking start moment to a braking end moment, and each of the braking occasions is a TTC corresponding to a braking start moment; and obtaining a target braking cycle and a target braking occasion based on the plurality of braking cycles and braking occasions, and obtaining the braking time parameter of the driver of the first vehicle based on the target braking cycle and the target braking occasion.

In one embodiment, the braking time parameter of the driver of the first vehicle is obtained by using the following formula:

$$T3 = Tb * Fs + Ts$$

where T3 is the braking time parameter of the driver of the first vehicle, Tb is the target braking cycle, Ts is the target braking occasion, and Fs is a preset safety parameter.

According to a second aspect, this application provides a collision warning apparatus, where the collision warning apparatus includes:

an obtaining module, configured to obtain a target deceleration and a target distance headway of a first vehicle, where the target deceleration and the target distance headway of the first vehicle are obtained through training based on historical travel data of the first vehicle, and the historical travel data of the first vehicle includes decelerations in a plurality of braking processes and distance headways of the first vehicle that correspond to a plurality of braking end moments; and a processing module, configured to obtain a time to collision TTC of the first vehicle and a leading vehicle based on the target deceleration and the target distance headway; and send warning information if it is determined that the TTC is less than or equal to a first threshold.

In one embodiment, the processing module is configured to obtain the TTC of the first vehicle and the leading vehicle by using the following formulas:

$$\Delta t = \frac{-\Delta v + \sqrt{\Delta v^2 + 2\Delta a (D - DHW)}}{\Delta a}$$

$$\Delta v = Vh - Vd$$

$$\Delta a = ah - ad$$

where $\Delta t$ is the TTC of the first vehicle and the leading vehicle, D is an inter-vehicle distance between the first vehicle and the leading vehicle, DHW is the target distance headway of the first vehicle, $\Delta v$ is a relative speed of the first vehicle against the leading vehicle, Vh is a travel speed of the first vehicle, Vd is a travel speed of the leading vehicle, Δa is a braking deceleration of the first vehicle against the leading vehicle, ah is the target deceleration of the first vehicle, and ad is a target deceleration of the leading vehicle.

In one embodiment, before determining that the TTC is less than or equal to the first threshold, the processing module is further configured to:

obtain the first threshold based on any one or any combination of an attention recall time parameter, a reaction-to-reminder time parameter, and a braking time parameter of a driver of the first vehicle, where the attention recall time parameter of the driver of the first vehicle means a time required for engaging attention of the driver back from a preset state of the driver, where the preset state includes an inattentive state;

the reaction-to-reminder time parameter of the driver of the first vehicle means a time required for the driver to react after the warning information is sent when the driver has paid attention; and the braking time parameter of the driver of the first vehicle means a time required for the first vehicle to restore a safe state after the driver takes a braking action.

In one embodiment, the processing module obtains the attention recall time parameter of the driver of the first vehicle in the following way:

obtaining driving behavior data of the driver at a current moment, where the driving behavior data includes any one or any combination of a limb behavior, a facial expression, and line-of-sight orientation information of the driver; and obtaining the attention recall time parameter of the driver of the first vehicle based on the driving behavior data.

In one embodiment, the processing module is configured to:

determine a status of the driver based on the driving behavior data, and obtain, based on the status of the driver and a correspondence between the status and the attention recall time parameter, the attention recall time parameter corresponding to the status of the driver.

In one embodiment, the correspondence between the status and the attention recall time parameter is obtained through machine learning based on prepared historical driving behavior data and historical attention recall time parameters of a plurality of drivers.

In one embodiment, the historical travel data of the first vehicle further includes a plurality of historical reaction-to-reminder time parameters of the driver of the first vehicle; and the processing module is configured to obtain the reaction-to-reminder time parameter of the driver of the first vehicle in the following way:

obtaining the reaction-to-reminder time parameter of the driver of the first vehicle based on the plurality of historical reaction-to-reminder time parameters.

In one embodiment, the processing module is configured to:

obtain the reaction-to-reminder time parameter of the driver of the first vehicle in an iteration manner based on the plurality of historical reaction-to-reminder time parameters, where the iteration manner includes: determining a deviation between a reaction-to-reminder time parameter obtained in a previous iteration and a reaction-to-reminder time parameter for a current iteration, and updating the reaction-to-reminder time parameter to a reaction-to-reminder time for the current iteration and performing a next iteration, if a deviation rate is greater than a deviation rate threshold, or ending the iterations and obtaining the reaction-to-reminder time parameter of the driver of the first vehicle, if a deviation rate is less than or equal to the deviation rate threshold, where the reaction-to-reminder time parameter for each iteration is obtained based on at least one historical reaction-to-reminder time parameter.

In one embodiment, the historical travel data further includes a plurality of braking start moments, a plurality of braking end moments corresponding to the plurality of braking start moments, and TTC values of the plurality of braking start moments;

the processing module is configured to obtain the braking time parameter of the driver of the first vehicle in the following way:

obtaining a plurality of braking cycles and braking occasions based on the historical travel data, where each of the braking cycles is a time length from a braking start moment to a braking end moment, and each of the braking occasions is a TTC corresponding to a braking start moment; and obtaining a target braking cycle and a target braking occasion based on the plurality of braking cycles and braking occasions, and obtaining the braking time parameter of the driver of the first vehicle based on the target braking cycle and the target braking occasion.

In one embodiment, the processing module is configured to obtain the braking time parameter of the driver of the first vehicle by using the following formula:

$$T3=Tb*Fs+Ts$$

where T3 is the braking time parameter of the driver of the first vehicle, Tb is the target braking cycle, Ts is the target braking occasion, and Fs is a preset safety parameter.

In one embodiment, the processing module is configured to:

sum up the attention recall time parameter and the braking time parameter of the driver of the first vehicle to obtain the first threshold.

In one embodiment, the processing module is configured to:

send the warning information at a first warning level if it is determined that the TTC is greater than a sum of the reaction-to-reminder time parameter and the braking time parameter and is less than or equal to the first threshold; or send the warning information at a second warning level if it is determined that the TTC is greater than the braking time parameter and is less than or equal to a sum of the reaction-to-reminder time parameter and the braking time parameter, where the first warning level is lower than the second warning level in intensity of warning.

In one embodiment, before sending the warning information, the processing module is further configured to:

determine the status of the driver of the first vehicle and/or the line-of-sight orientation information of the driver, and determine, based on the status of the driver of the first vehicle and/or the line-of-sight orientation information of the driver, a manner of sending the warning information.

In one embodiment, the processing module is configured to:

determine, if it is determined that the driver of the first vehicle is in a fatigued state, that the manner of sending the warning information is a vibration mode; and/or determine, if it is determined that the line-of-sight orientation information of the driver indicates a direction other than a right-ahead direction, that the manner of sending the warning information is a voice mode and/or an enhanced display mode.

In one embodiment, the processing module is configured to obtain the target deceleration of the first vehicle by training in the following way:

selecting, among decelerations in a plurality of braking processes, a deceleration greater than a first threshold and less than a second threshold, and obtaining the target deceleration based on the selected deceleration; and the target distance headway of the first vehicle is obtained through training in the following way:

selecting, among distance headways of the first vehicle that correspond to the plurality of braking end moments, a distance headway greater than a third threshold and less than a fourth threshold, and obtaining the target distance headway based on the selected distance headway.

According to a third aspect, this application provides a collision warning apparatus. The collision warning apparatus has functions exemplified in the method according to the first aspect. The collision warning apparatus includes a processor and a memory, and the memory stores a computer program. In one embodiment, the program may include program code, and the program code includes an instruction. The memory may include a random access memory (RAM), or may be a non-volatile memory, for example, at least one magnetic disk memory. When the processor reads and executes the computer program stored in the memory, the collision warning apparatus is enabled to implement the collision warning method provided in any one of the foregoing designs.

In one embodiment, the processor and the memory may be connected to each other by using a bus. The bus may be a peripheral component interconnect (PCI) bus, an extended industry standard architecture (EISA) bus, or the like. The bus may be classified into an address bus, a data bus, a control bus, and the like.

This application further provides a computer-readable storage medium. The storage medium stores an instruction. When the instruction is run on a computer, the computer is enabled to perform the collision warning method provided in any one of the foregoing designs.

This application further provides a computer program product that includes an instruction. When the instruction is run on a computer, the computer is enabled to perform the collision warning method provided in any one of the foregoing designs.

This application further provides a computer program. When the computer program is run on a computer, the computer is enabled to perform the collision warning method provided in any one of the foregoing designs.

This application further provides a chip. The chip is connected to a memory, and is configured to read and execute a software program stored in the memory to perform the collision warning method provided in any one of the foregoing designs.

BRIEF DESCRIPTION OF DRAWINGS

FIG. 9a-1 and FIG. 9a-2 are a schematic flowchart of overall implementation of a collision warning method according to this application;

DESCRIPTION OF EMBODIMENTS

The following further illustrates the embodiments of this application in detail with reference to the accompanying drawings of this specification.

Figure 1:
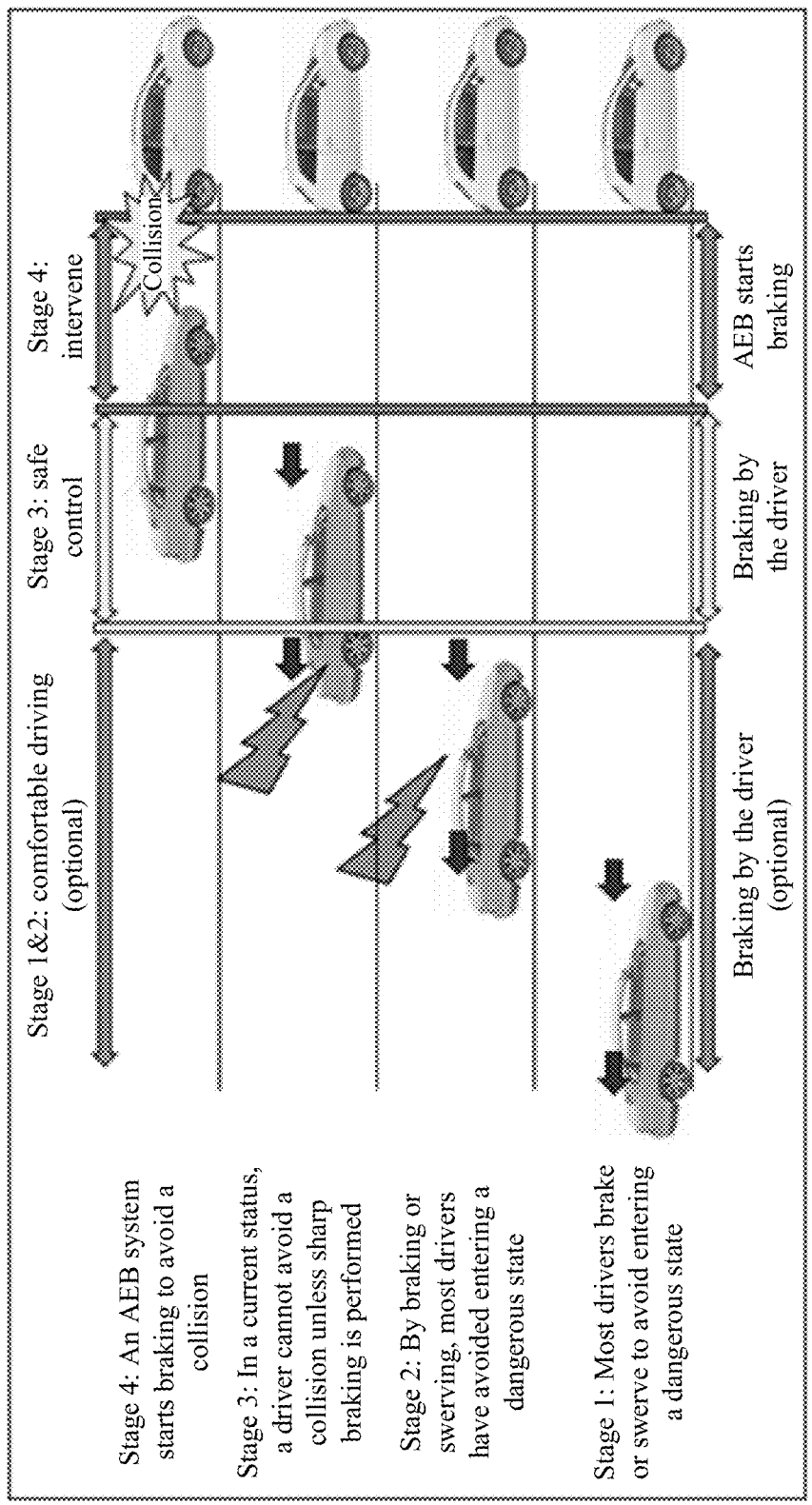
FIG. 1 is a schematic diagram of a forward collision process.

FIG. 1 is a schematic diagram of a forward collision process. As shown in FIG. 1, a forward collision process may be divided into four stages in view of a danger level. The following describes the four stages with reference to FIG. 1. Stage 1: In a comfortable driving stage, when becoming aware of a collision risk, most drivers brake or swerve in advance to avoid entering a dangerous state. Stage 2: In the comfortable driving stage, by braking or swerving, the driver can keep a proper safety distance and avoid entering a dangerous state. Stage 3: In a safe control range, a collision is not avoidable unless the driver or a system brakes or swerves sharply and emergently. Stage 4: Due to ineffective braking, a subject vehicle continues to approach a leading vehicle, the system detects necessity of highest-level braking, and an AEB system is started. The FCW system works in stage 1, stage 2, and stage 3 above, and the AEB system works in stage 4 above.

To avoid a technical problem of low warning efficiency caused by a unified warning manner, another solution in the prior art enables an operation of setting a distance headway, and lets the driver set the distance headway, so that different drivers can set different distance headways. The solution is adaptable to some extent. However, the driver cannot accurately calculate a comfortable distance headway, and cannot clearly describe a time left before a warning is raised. Therefore, it is difficult for the FCW system to adapt to a reaction time and a braking mode of each individual driver, and it is difficult to effectively avoid too early warning or too late warning.

Therefore, this application provides a collision warning method, in which a target deceleration and a target distance headway of a first vehicle are obtained through training based on historical travel data of the first vehicle (a subject vehicle), a TTC of the first vehicle and a leading vehicle is obtained, and whether to send warning information is determined based on a comparison between the TTC and the first threshold. Because the target deceleration and the target distance headway of the first vehicle can reflect personal driving habit characteristics of a driver of the first vehicle, the TTC obtained based on the historical travel data is highly adaptable, thereby effectively resolving the technical problem of low warning effectiveness that is caused by a unified deceleration and a unified distance headway in the prior art.

The collision warning method in this application is applicable to a collision warning apparatus. The collision warning apparatus may be an apparatus that is disposed in a vehicle and that has a data processing function and a control function. In another embodiment, the apparatus for performing the collision warning method may have another name, and this application does not limit the name of the apparatus.

Figure 2A:
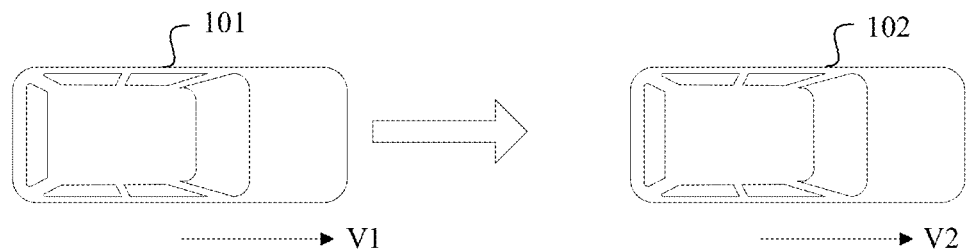
FIG. 2a is a schematic diagram of a possible scenario to which this application is applicable.

FIG. 2a is a schematic diagram of a possible scenario to which this application is applicable. As shown in FIG. 2a, a first vehicle 101 and a leading vehicle 102 travel in a same direction, and the leading vehicle 102 is in front of the first vehicle 101. For the first vehicle 101, if the leading vehicle 102 travels at a low speed, decelerates or brakes, a risk of forward collision exists. In this case, the collision warning apparatus in the first vehicle 101 needs to effectively send warning information to a driver of the first vehicle 101 in time based on a predicted danger.

Figure 2B:
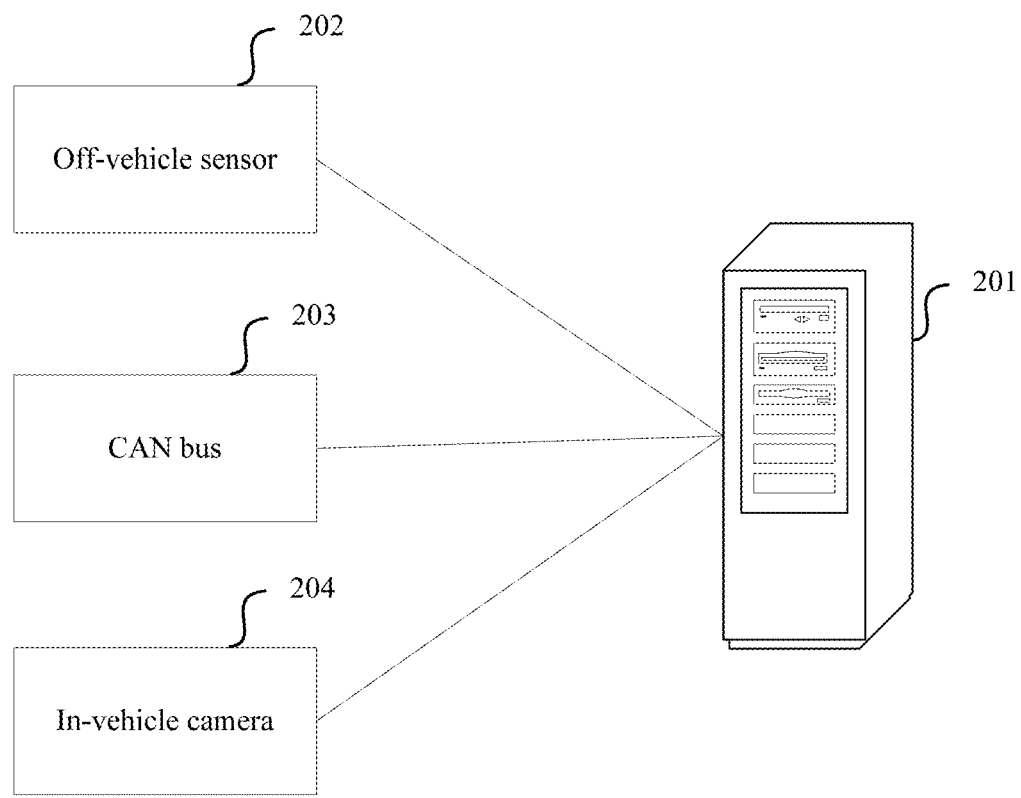
FIG. 2b shows a system architecture to which this application is applicable.

The following uses the first vehicle shown in FIG. 2a as an example to describe a system architecture to which this application is applicable. Referring to FIG. 2b, the first vehicle 101 may include a collision warning apparatus 201, an off-vehicle sensor 202, a controller area network (CAN) bus 203, and an in-vehicle camera 204.

The off-vehicle sensor 202, the CAN bus 203, and the in-vehicle camera 204 can be used to collect information. The collision warning apparatus 204 can obtain the information collected by the off-vehicle sensor 202 and the in-vehicle camera 204, and obtain information from the CAN bus 203. In this way, a warning can be sent to the driver of the vehicle based on the obtained information. In this application, the information collected by the off-vehicle sensor 202 may include travel information of the first vehicle, road traffic information, a distance headway of the first vehicle, and the like. The information collected by the CAN bus 203 may include a travel speed, an acceleration/deceleration, a steering angle, or the like of the first vehicle. The information collected by the in-vehicle camera 204 may include driving behavior data, line-of-sight orientation information, and the like of the driver of the first vehicle.

It should be noted that this application describes how to send a warning to the driver of the first vehicle by using the "first vehicle" as an example. For each vehicle that needs to be warned and meets warning setting requirements, the foregoing method can be applied to, and the type of the vehicle is not limited.

Figure 3:
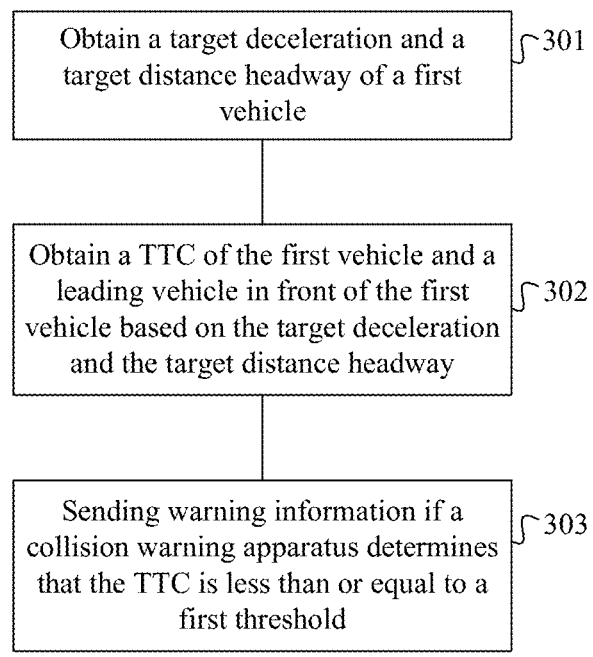
FIG. 3 is a schematic flowchart corresponding to a collision warning method according to this application.

FIG. 3 is a schematic flowchart corresponding to a collision warning method according to this application. As shown in FIG. 3, the method includes the following operations.

Operation 301: Obtain a target deceleration and a target distance headway of a first vehicle.

The target deceleration and the target distance headway of the first vehicle may be parameters that can effectively reflect driving habits of a driver and that are obtained through training historical travel data. In one embodiment, the historical travel data of the first vehicle includes decelerations in a plurality of braking processes of the first vehicle, and distance headways of the first vehicle that correspond to a plurality of braking end moments (that is, an inter-vehicle distance between the first vehicle and a leading vehicle). For a training manner, refer to big data processing manners in the prior art. This application does not limit the training manner.

One embodiment of obtaining the target deceleration of the first vehicle is: among decelerations in the plurality of braking processes, selecting a deceleration greater than a first threshold and less than a second threshold (the selected decelerations are representative decelerations and can well reflect the driving habits of the driver), and obtaining the target deceleration based on the selected decelerations, for example, averaging out the selected decelerations to obtain the target deceleration. The second threshold is greater than the first threshold, and the first threshold and the second threshold may be set by a person skilled in the art based on experience and actual needs. Alternatively, in this application, a representative deceleration may be selected from the decelerations in the plurality of braking processes based on a normal distribution, so as to obtain the target deceleration. The manner of obtaining the target deceleration is not limited.

Similarly, one embodiment of obtaining the target distance headway of the first vehicle may be: among distance headways of the first vehicle that correspond to the plurality of braking end moments, selecting a distance headway greater than a third threshold and less than a fourth threshold, and obtaining the target distance headway based on the selected distance headway. For an implementation, refer to the foregoing description. The fourth threshold is greater than the third threshold, and the third threshold and the fourth threshold may be set by a person skilled in the art based on experience and actual needs.

It should be noted that, to ensure rationality of a result, before machine learning is performed based on the historical travel data of the first vehicle, the historical travel data may be filtered, and only data that meets a preset condition is selected for machine learning. For example, in calculating the target distance headway, only data with an inter-vehicle distance less than 100 m is selected for machine learning.

Further, the historical travel data of the first vehicle may further include travel speeds corresponding to a plurality of braking start moments of the first vehicle, an inter-vehicle distance between the first vehicle and the leading vehicle (before braking), a TTC, and a plurality of inter-vehicle distances between the first vehicle and the leading vehicle (after braking) that correspond to a plurality of braking end moments. Table 1 shows an example of the historical travel data of the first vehicle.

TABLE 1

| | | | | | | | |
|---|---|---|---|---|---|---|---|
| Example of historical travel data content of the first vehicle | | | | | | | |
| Braking start moment | Travel speed | Inter-vehicle distance between the first vehicle and the leading vehicle (before braking) | TTC (at the braking start moment) | Braking end moment | Inter-vehicle distance between the first vehicle and the leading vehicle (after braking) | TTC (at the braking end moment) | Deceleration in a braking process |
| Braking start moment 1 | | | | Braking end moment 1 | | | |
| Braking start moment 2 | | | | Braking end moment 2 | | | |
| ... | | | | ... | | | |
| Braking start moment n | | | | Braking end moment n | | | |

Table 1 is merely an example of the historical travel data of the first vehicle. In an actual application, some contents may be added or deleted in Table 1 as actually required. In one embodiment, the travel speeds corresponding to the plurality of braking start moments, the inter-vehicle distance and TTC between the first vehicle and the leading vehicle, and the inter-vehicle distances and TTCs between the first vehicle and the leading vehicle that correspond to the plurality of braking end moments in Table 1 can be directly collected, but the deceleration in a braking process may be not directly collectible. In this application, the deceleration in a braking process can be calculated in various ways. For example, the deceleration in a braking process may be calculated based on a travel distance, a travel time, and a travel speed of the first vehicle in a period from the braking start moment to the braking end moment.

In this application, the collision warning apparatus may train the historical travel data of the first vehicle beforehand to obtain and store the target deceleration and the target distance headway of the first vehicle. In this way, in operation 301, the collision warning apparatus can directly obtain the stored target deceleration and target distance headway. Alternatively, in another embodiment, the target deceleration and the target distance headway of the first vehicle may be obtained and stored by another apparatus other than the collision warning apparatus by training the historical travel data of the first vehicle beforehand. In this case, in operation 301, the collision warning apparatus can directly obtain the target deceleration and the target distance headway from the another apparatus. In this way, because the collision warning apparatus can directly obtain trained parameters, efficiency of a collision warning process can be effectively improved. Further, the stored target deceleration and target distance headway of the first vehicle are updated at set intervals, and therefore, the target deceleration and the target distance headway of the first vehicle are more consistent with driving habits of the driver, and reasonableness of results is effectively ensured.

In one embodiment, the collision warning apparatus may, whenever a collision warning process is performed, update the historical travel data of the first vehicle, and train the updated historical travel data of the first vehicle to obtain the target deceleration and the target distance headway of the first vehicle. For example, when performing a collision warning process at the $n^{th}$ moment, the collision warning apparatus may train historical travel data to obtain the target deceleration and the target distance headway of the first vehicle, where the historical travel data is obtained through statistics performed in a period from initial startup of the first vehicle by the driver to the $n^{th}$ moment. When performing a collision warning process at the $(n+1)^{th}$ moment, the collision warning apparatus may train historical travel data to obtain the target deceleration and the target distance headway of the first vehicle, where the historical travel data is obtained through statistics performed in a period from the initial startup of the first vehicle by the driver to the $(n+1)^{th}$ moment.

Operation 302: Obtain a time to collision TTC of the first vehicle and a leading vehicle in front of the first vehicle based on the target deceleration and the target distance headway.

In this operation, in one embodiment, the collision warning apparatus may obtain the TTC of the first vehicle and the leading vehicle by using the following formulas:

$$\Delta t = \frac{-\Delta v + \sqrt{\Delta v^2 + 2\Delta a(D - DHW)}}{\Delta a} \quad \text{Formula 1}$$

$$\Delta v = Vh - Vd \quad \text{Formula 2}$$

$$\Delta a = ah - ad \quad \text{Formula 3}$$

where $\Delta t$ is the TTC of the first vehicle and the leading vehicle, D is an inter-vehicle distance between the first vehicle and the leading vehicle, DHW is the target distance headway of the first vehicle, $\Delta v$ is a relative speed of the first vehicle against the leading vehicle, Vh is a travel speed of the first vehicle, Vd is a travel speed of the leading vehicle (assuming that the travel speed of the leading vehicle remains unchanged in the braking process), $\Delta a$ is a braking deceleration of the first vehicle against the leading vehicle, ah is the target deceleration of the first vehicle, and ad is a target deceleration of the leading vehicle.

Operation 303: Send warning information if it is determined that the TTC is less than or equal to a first threshold.

In this operation, in one embodiment, the first threshold may be set by a person skilled in the art based on experience and actual needs, or may be a value such as 2.7 s obtained through big data processing in a manner provided in the prior art.

In one embodiment, the first threshold is obtained based on any one or any combination of an attention recall time parameter, a reaction-to-reminder time parameter, and a braking time parameter of the driver of the first vehicle. The attention recall time parameter of the driver of the first vehicle means a time required for engaging attention of the driver back from a preset state of the driver; the reaction-to-reminder time parameter of the driver of the first vehicle means a time required for the driver to react after the collision warning apparatus sends the warning information when the driver has paid attention; and the braking time parameter of the driver of the first vehicle means a time required for the first vehicle to restore a safe state after the driver takes a braking action. It should be noted that the preset state in this application may include an inattentive state, such as a fatigued state or a distracted state.

From the foregoing description, it can be learned that in determining the first threshold, any one or any combination of the attention recall time parameter, the reaction-to-reminder time parameter, and the braking time parameter of the driver of the first vehicle may be introduced, and the first threshold is determined based on the introduced parameter. Because any one of the parameters can effectively reflect personal characteristics of the driver, determining the first threshold based on any one of the foregoing parameters is more adaptable than the prior art in which a fixed value is uniformly used. In an example, the first threshold may be obtained based on the reaction-to-reminder time parameter and the braking time parameter of the first vehicle. For example, the first threshold is equal to a sum of the reaction-to-reminder time parameter and the braking time parameter of the first vehicle plus a preset time. A reaction-to-reminder time and a braking time required by a driver vary with drivers. Therefore, for a driver who reacts quickly and requires a short braking time, the first threshold may be set by taking all the factors into account so that the corresponding first threshold is relatively low. In this way, drivers with different driving habits can be treated differently, and user experience is improved.

Further, the first threshold in this application may be a sum of the attention recall time parameter, the reaction-toreminder time parameter, and the braking time parameter of the driver of the first vehicle. In this case, the three time parameters comprehensively cover an entire stage from receiving a warning to completing braking by the driver. Therefore, the first threshold is obtained based on the three time parameters, and the TTC is compared with the first threshold to determine whether to trigger a warning. In this way, warning service can be provided to the driver more accurately, and reasonableness and effectiveness of the warning are fully ensured.

In this application, the attention recall time parameter, the reaction-to-reminder time parameter, and the braking time parameter of the driver of the first vehicle may be determined in diverse manners. The following describes a possible manner for the attention recall time parameter, the reaction-to-reminder time parameter, and the braking time parameter of the driver of the first vehicle separately.

(1) Attention Recall Time Parameter (T1) of the Driver of the First Vehicle

Driving behavior data (momentary driving behavior data) of the driver at a current moment is obtained, and the attention recall time parameter of the driver of the first vehicle is obtained based on the driving behavior data.

In one embodiment, status of the driver may be determined based on the driving behavior data of the driver, and the attention recall time parameter corresponding to the status of the driver, that is, the attention recall time parameter of the driver, is obtained based on the status of the driver and a correspondence between the status and the attention recall time parameter.

In this application, a driver perception algorithm may be executed based on the driving behavior data of the driver at the current moment to determine the status of the driver. The driving behavior data of the driver at the current moment may include a limb behavior, a facial expression, or line-of-sight orientation information and the like of the driver at the current moment. Based on the facial expression of the driver, a fatigue level of the driver can be identified. Based on the limb behavior and a line of sight of the driver, it can be identified whether the driver is distracted.

Further, in some cases (for example, when the driver is distracted), the status reflected by the limb behavior, facial expression, or line-of-sight orientation information of the driver may be not accurate enough. Therefore, the status of the driver may be determined with reference to road traffic data, vehicle travel Information, and the like. The road traffic data, the vehicle travel information, and the like may be collected by an off-vehicle sensor. In one embodiment, the status of the driver may be determined with reference to voice information or the like. The voice information may be obtained by a voice collection apparatus installed in the vehicle. For example, if information collected by the voice collection apparatus shows that the driver is speaking, it can be recognized that the driver is in a distracted state. The foregoing description of determining the status of the driver based on the driving behavior data is merely an example. This is not limited in this application.

The status of the driver means an attention type and an attention level of the driver. The correspondence between the status and the attention recall time parameter means a correspondence between the attention type plus the attention level and the attention recall time parameter. In this application, the correspondence between the status and the attention recall time parameter may be pre-stored in the collision warning apparatus in diverse manners, for example, pre-stored in a form of a data table (attention recall time parameter table).

In one embodiment, the collision warning apparatus obtains the attention type and the attention level of the driver of the first vehicle based on the driving behavior data of the driver of the first vehicle, and obtains the attention recall time parameter of the driver of the first vehicle by searching an attention recall time parameter table.

The attention recall time parameter table is detailed below first.

In this application, a recall time parameter varies depending on the attention type of the driver. For example, when the attention type of the driver is a normal type, attention of the driver can be recalled immediately. When the attention type of the driver is a fatigued or distracted type, it may take a relatively long time to recall the attention of the driver. In view of this, attention types may break down into three types: normal, fatigued, and distracted. Further, the fatigued type and the distracted type may be subdivided into attention levels. In one embodiment, Table 2 shows examples of attention types and attention levels.

TABLE 2

Examples of attention types and attention levels

| Attention type | Attention level | Remarks | Default recall time (s) |
|---|---|---|---|
| Normal | 0 | Holding a steering wheel, and driving a vehicle properly by acting correspondingly with the line of sight following a driving status. | 0 |
| Fatigued | 1 | Low: Eyes are sluggish, blurred, or blinking frequently; the driver is a little yawning and appears tired. | 3 |
|  | 2 | Medium: The driver closes eyes frequently or is yawning, rubbing eyes or touching the forehead, or the like, struggling to be sober. | 10 |
|  | 3 | High: The driver is intensely struggling to be sober, or frequently falls into a momentary sleep and loses control, and is already unable to drive, or even falls asleep directly. | 20 |
| Distracted | 1 | Easy to recall: The driver is incidentally distracted for a short time (<2 s), diverts the line of sight (<2 s) and engages in other additional tasks, with hands off the steering wheel for a long time, or the like. | 2 |
|  | 2 | Out-of-the-loop: The line of sight is often diverted from the driving direction, and it takes a long time (>2 s) to redirect the line of sight to the driving direction. The driver engages in other additional tasks or is chatting for a long time and loses control of the vehicle. | 4 |

Figure 4:
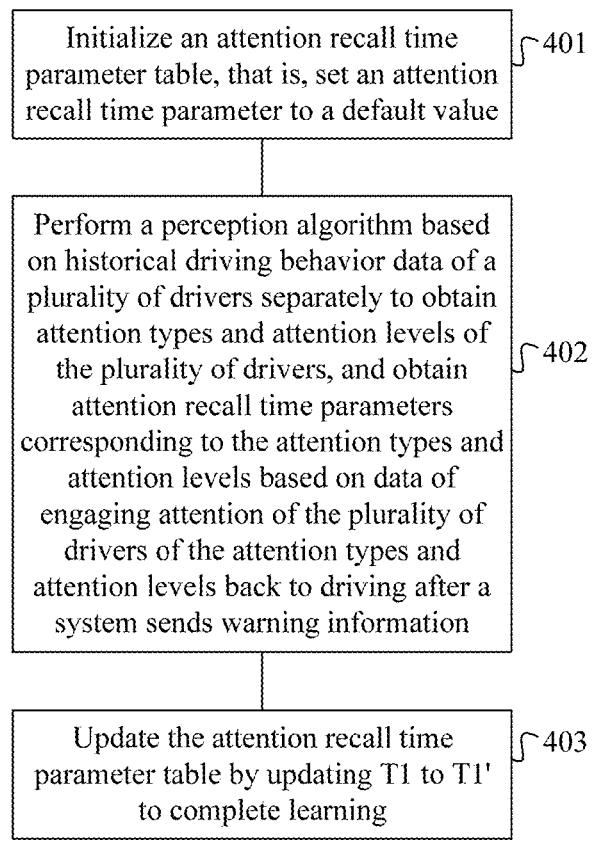
FIG. 4 is a schematic flowchart of obtaining an attention recall time parameter table.

From Table 2, it can be learned that a different attention type or attention level corresponds to a different default recall time value. Based on Table 2, in this application, data of different fatigue levels, different distraction types, and driving status recovered after the driver is reminded may be extracted from historical driving data of a plurality of drivers, and learned to obtain an attention recall time parameter of a group. As shown in FIG. 4, a process includes the following operations.

Operation 401: Initialize an attention recall time parameter table. In one embodiment, set an attention recall time parameter to a default value.

Operation 402: Perform a perception algorithm based on historical driving behavior data of a plurality of drivers separately to obtain attention types and attention levels of the plurality of drivers, and obtain attention recall time parameters (T1') corresponding to the attention types and attention levels based on data of engaging attention of the plurality of drivers of the attention types and attention levels back to driving (that is, historical attention recall time parameters of the plurality of drivers) after a system sends warning information. In one embodiment, T1' may be obtained by processing statistical value probability distribution, noise filtering, and feature values based on the data of engaging the attention of the plurality of drivers of the attention types and attention levels back to driving after the system sends the warning information. This is not limited in this application.

Operation 403: Update the attention recall time parameter table, that is, Table 3, T1=T1', so that learning of the attention recall time parameter is completed.

TABLE 3

Attention recall time parameter table

| Attention type | Attention level | Recall time parameter (learned value) (s) |
|---|---|---|
| Normal | 0 | NA |
| Fatigued | 1 | * |
|  | 2 | * |
|  | 3 | * |
| Distracted | 1 | * |
|  | 2 | * |

From the foregoing description, it can be learned that the attention recall time parameter table may be obtained beforehand by counting the historical driving behavior data and the historical attention recall time parameters of a plurality of drivers. The attention recall time parameter table may be pre-stored in the collision warning apparatus disclosed in this application.

Figure 5:
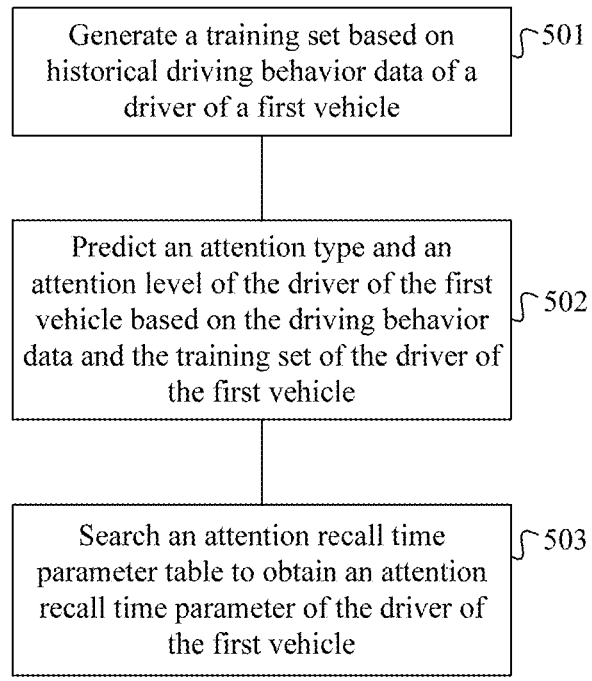
FIG. 5 is a schematic processing flowchart of obtaining an attention recall time parameter of a driver of a first vehicle.

Based on the foregoing description of the attention recall time parameter table, the following gives a detailed description of a processing flow of the collision warning apparatus in obtaining the attention recall time parameter of the driver of the first vehicle. As shown in FIG. 5, the processing flow includes the following operations.

Operation 501: Generate a training set based on historical driving behavior data of a driver of a first vehicle. In one embodiment, historical driving behavior data (including a limb behavior, a facial expression, line-of-sight orientation information, and the like of the driver) of the driver of the first vehicle is annotated. Further, the data may be combined with road traffic data, vehicle travel information, and the like to undergo training and fitting through a deep neural network. After several iterations, if a system error is lower than a threshold, the training is completed, and a training set is generated.

Operation 502: Predict an attention type and an attention level of the driver of the first vehicle based on the driving behavior data and the training set of the driver of the first vehicle. In one embodiment, real-time prediction is performed on the driver by using a trained model, and an attention type and an attention level of the driver are output and correspond to six states in Table 2 and Table 3, in which a normal state and a fatigued state each break down into "high", "medium", and "low", and a distracted state breaks down into "easy to recall" and "out-of-the-loop".

Operation 503: Search an attention recall time parameter table to obtain an attention recall time parameter of the driver of the first vehicle. In one embodiment, in view of the attention type and attention level (fatigued, distracted) of the driver, the attention recall time parameter corresponding to the attention type and the attention level of the driver can be obtained by searching Table 3.

In one embodiment, the driving behavior data may be in a form of a picture (or an image). In other words, the driving behavior of the driver may be photographed by an in-vehicle camera to obtain a picture, and the obtained picture may be input into the preset model to obtain the attention recall time parameter of the driver. The preset model may be obtained beforehand in diverse training manners, and the training manners are no detailed herein again.

(2) Reaction-to-Reminder Time Parameter (T2) of the Driver of the First Vehicle

The following describes the reaction-to-reminder time parameter first.

In this application, after the collision warning apparatus sends warning information, a time required for each different driver to react varies depending on factors such as age, gender, driving skill, and driving habits. The time required for a same driver to react may vary with a warning mode (an image, a sound, a vibration, and the like). Generally, the time required for a driver to react to an image is longer than the time required for reacting to a sound or a vibration. To ensure sufficient safety, a maximum value in the times required for reacting to all warning modes, that is, the time required for reacting to a warning image, is used as the reaction-to-reminder time parameter.

Figure 6:
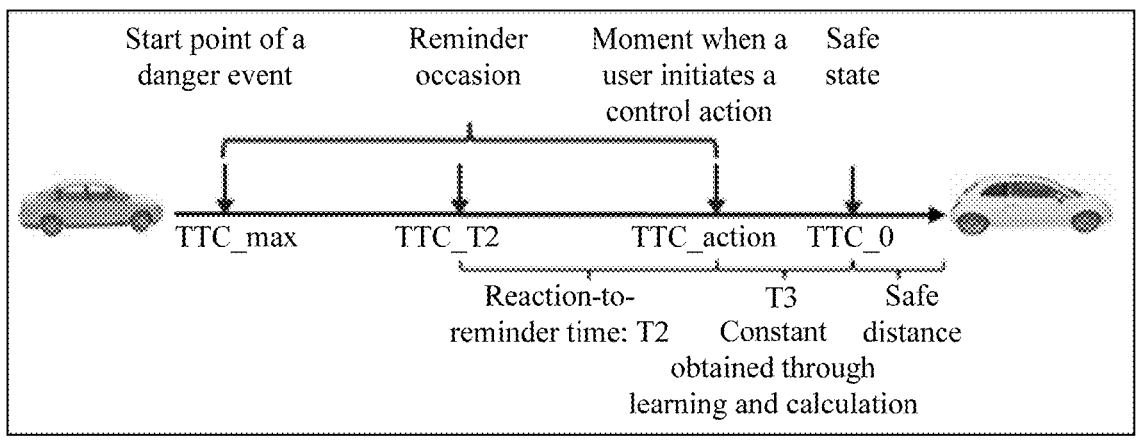
FIG. 6 is a schematic diagram of composition of a reaction-to-reminder time parameter.

FIG. 6 is a schematic diagram of composition of a reaction-to-reminder time parameter. In FIG. 6, TTC_0 is a time point when the driver controls a vehicle to restore a safe state; TTC_action is a time point when the driver (or a user) initiates a control action (including braking, and sharp swerve into another lane to avoid an obstacle), defined as TTC_action=T3, where T3 is a braking time parameter; T2 is a reaction-to-reminder time, initially defined as T2=2*T3 allowing for a sufficient safety margin.

TTC_max is a start point of a danger event, and this time point serves as a maximum threshold of T2 adjusted. In one embodiment, TTC_max=TTC_action+2*T3. TTC_T2 is a reminder occasion (that is, a time point of a reminder), located between TTC_max and TTC_action, and initially set to TTC_max.

In this application, the reaction-to-reminder time parameter of the driver of the first vehicle may be obtained by learning reaction characteristics of the driver based on a historical reaction-to-reminder time (a time required for the driver to react after warning information is sent) of the driver of the first vehicle. In one embodiment, the reaction-to-reminder time parameter is set to an initial value first, and then iterations are performed based on a plurality of historical reaction-to-reminder time parameters. An iteration manner is: determining a deviation between a reaction-to-reminder time parameter obtained in a previous iteration and a reaction-to-reminder time parameter for a current iteration, and updating the reaction-to-reminder time parameter to a reaction-to-reminder time of the current iteration and performing a next iteration, if a deviation rate is greater than a deviation rate threshold, or ending the iterations and obtaining the reaction-to-reminder time parameter for the driver of the first vehicle, if a deviation rate is less than or equal to the deviation rate threshold.

The reaction-to-reminder time parameter for each iteration is obtained based on at least one historical reaction-to-reminder time parameter. For example, the reaction-to-reminder time parameter for each iteration is obtained by averaging out 100 historical reaction-to-reminder time parameters. Further, a quantity of the historical reaction-toreminder time parameters that serve as a basis for obtaining the reaction-to-reminder time parameter for each iteration may be the same or different, and is not limited.

In one example, when the first vehicle is initially started up by the driver, the reaction-to-reminder time parameter begins to be counted. When the quantity of historical reaction-to-reminder time parameters reaches 100, the reaction-to-reminder time parameter for a first iteration is obtained based on the 100 historical reaction-to-reminder time parameters, and the reaction-to-reminder time parameter for the first iteration is compared with an initial value. If a deviation rate between the reaction-to-reminder time parameter for the first iteration and the initial value is greater than a deviation rate threshold, the reaction-to-reminder time parameter of the driver is updated to a reaction-to-reminder time for the first iteration, a reminder occasion is updated, and the reaction-to-reminder time parameter is re-counted. When the quantity of re-counted reaction-to-reminder time parameters reaches 100, the reaction-to-reminder time parameter for a second iteration is obtained based on the 100 re-counted historical reaction-to-reminder time parameters, and the reaction-to-reminder time parameter for the second iteration is compared with a result of the first iteration (that is, the reaction-to-reminder time parameter of the driver updated in the first iteration). If a deviation rate between the reaction-to-reminder time parameter for the second iteration and the result of the first iteration is greater than the deviation rate threshold, the reaction-to-reminder time parameter of the driver is updated to a reaction-to-reminder time for the second iteration, the reminder occasion is updated, and the reaction-to-reminder time parameter is further re-counted, and so on. If a deviation rate between the reaction-to-reminder time parameter for the $n^{th}$ iteration and a result of the $(n-1)^{th}$ iteration is less than the deviation rate threshold, the reaction-to-reminder time parameter of the driver is updated to a reaction-to-reminder time for the $n^{th}$ iteration, and the iteration process is ended. It should be noted that, in this case, the deviation rate between the reaction-to-reminder time parameter for the $n^{th}$ iteration and the result of the $(n-1)^{th}$ iteration is relatively small, and both the reaction-to-reminder time parameter for the $n^{th}$ iteration and the result of the $(n-1)^{th}$ iteration are consistent with driving habits of the driver, and therefore, after the deviation rate between the reaction-to-reminder time parameter for the $n^{th}$ iteration and the result of the $(n-1)^{th}$ iteration is less than the deviation rate threshold, no more update is required, and the result of the $(n-1)^{th}$ iteration may be directly used as the reaction-to-reminder time parameter of the driver, and the iteration process is ended. This is not limited in this application. The deviation rate threshold may be preset by a person skilled in the art based on experience and actual conditions, for example, may be preset to 5%.

It should be noted that the iteration process in this application may be performed at preset intervals (of one month, for example). In the foregoing example, after the iteration process is ended and one interval has elapsed, the foregoing iteration process may be started over to update the reaction-to-reminder time parameter of the driver, so that the reaction-to-reminder time parameter is in relatively high consistency with reaction characteristics of the driver.

Figure 7:
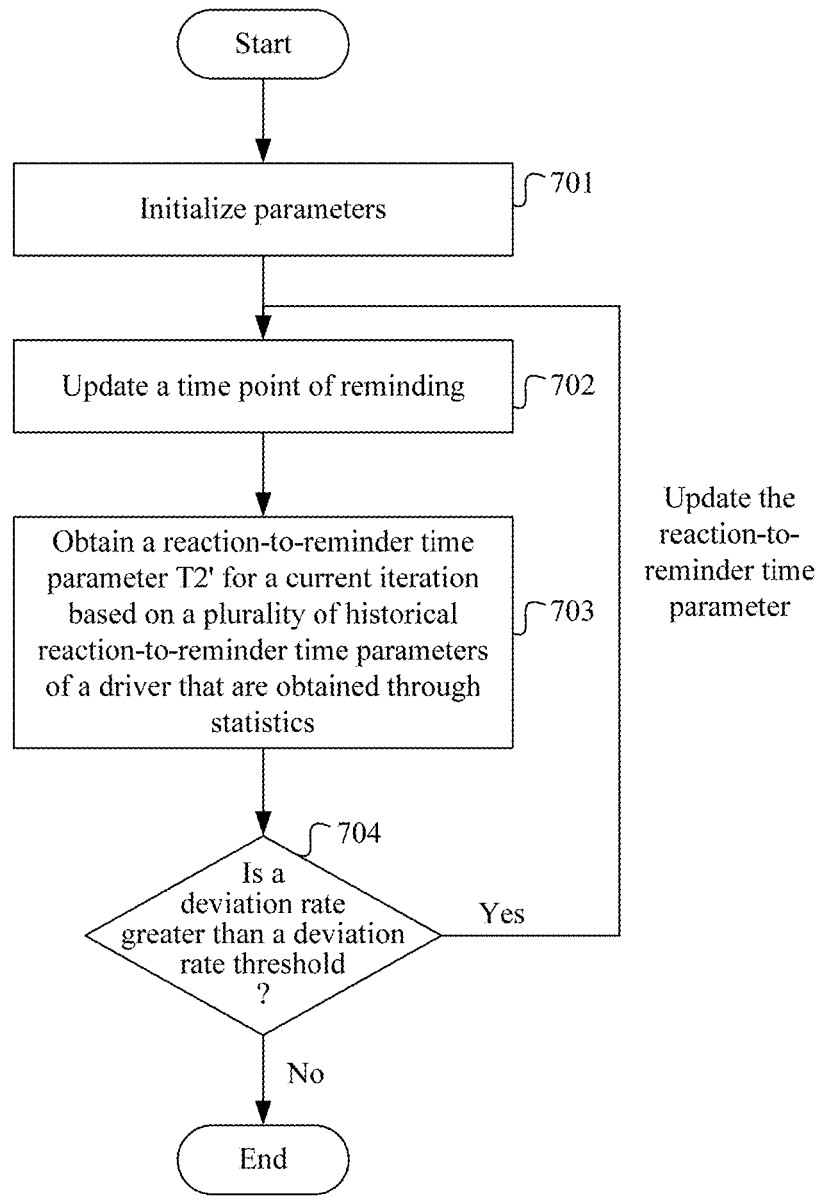
FIG. 7 is a schematic flowchart of obtaining a reaction-to-reminder time parameter of a driver of a first vehicle.

An iteration process is described below with reference to FIG. 7. As shown in FIG. 7, the process includes:

Operation 701: Initialize parameters: T2=2*T3, and TTC_max=TTC_action+2*T3;

Operation 702: Update a time point of reminding: TTC_T2=TTC_action+T2;

Operation 703: Obtain a reaction-to-reminder time parameter T2' for a current iteration based on a plurality of historical reaction-to-reminder time parameters of a driver that are obtained through statistics; and Operation 704: Determine a deviation (T2-T2') between a reaction-to-reminder time T2 obtained in a previous iteration and a reaction-to-reminder time T2' for the current iteration. If a deviation rate of the deviation is greater than a deviation rate threshold, update the reaction-to-reminder time parameter from T2 to T2', and perform operation 702 to perform a next iteration. If the deviation rate is less than or equal to the deviation rate threshold, the iteration is ended and learning of the reaction-to-reminder time is completed.

The following gives an example to describe the iteration process.

Assuming that T3=2.5 s, then TTC_action=TTC_0+2.5 s, and TTC_max=TTC_0+7.5 s.

The reaction-to-reminder time is set to an initial value. In one embodiment, T2 is set to 5 s, where TTC_T2=TTC_0+7.5 s.

A first iteration begins. Through learning of reaction times of a driver, it is determined that the reaction-to-reminder time T2' is 3 s. Because a difference between T2 and T2' is 2 s, that is, a deviation rate is greater than 5%, T2 is updated to 3 s (T2'), and a next iteration begins.

. . .

T2 for the $i^{th}$ iteration is 1.6 s. Through learning of the reaction times of the driver, it is determined that T2' is 1.58 s. Because the deviation rate between T2 and T2' is less than 5%, the iteration process is ended, and the reaction-to-reminder time parameter of the driver is obtained.

In this way, a final result can be obtained through iterations based on historical reaction data of the driver, and therefore, accuracy of the result can be effectively ensured, and experience of the driver can be effectively improved.

(3) Braking Time Parameter (T3) of the Driver of the First Vehicle

As shown in Table 1, a plurality of braking cycles and braking occasions of the driver are obtained based on historical travel data in a first set time segment. Each of the braking cycles is a time length from a braking start moment to a braking end moment, and each of the braking occasions is a TTC value existent at a braking start moment.

In one embodiment, the historical travel data includes a plurality of braking start moments, a plurality of corresponding breaking end moments, and TTC values of the plurality of braking start moments. Therefore, a plurality of braking cycles can be obtained based on the plurality of braking start moments and the plurality of corresponding breaking end moments. A target braking cycle can be obtained based on the plurality of braking cycles. For an implementation, refer to the target deceleration described above, and no repeated description is given herein. Similarly, a target braking occasion can be obtained based on TTC values existent at a plurality of braking start moments.

Figure 8:
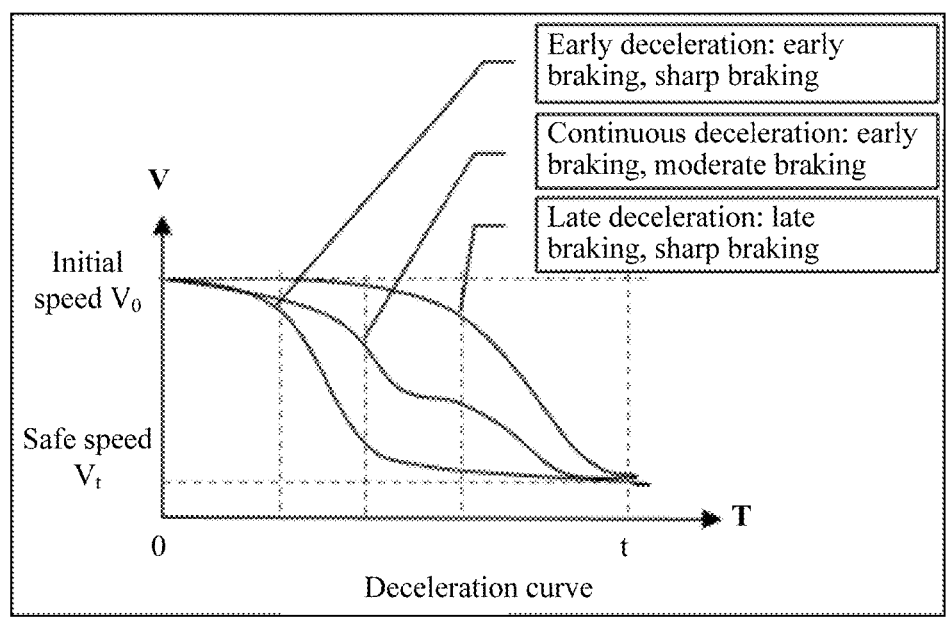
FIG. 8 is a schematic diagram of a typical deceleration curve.

FIG. 8 is a schematic diagram of a typical deceleration curve. FIG. 8 shows that early deceleration corresponds to a safe/conservative type, continuous deceleration corresponds to a safe/comfortable type, and late deceleration corresponds to a sporty type of driving habits, apparently taking on distinct personalities. In one embodiment, a braking cycle of a safe/conservative driver is less than that of a sporty driver, and less than that of a safe/comfortable driver. A braking occasion of a safe/conservative driver is close to a braking occasion of a safe/comfortable driver, and is earlier than a braking occasion of a sporty driver.

Further, a braking time parameter T3 can be obtained by using the following formula based on the obtained target braking cycle and target braking occasion:

$$T3 = Tb * Fs + Ts$$

where T3 is a braking time parameter, Tb is the target braking cycle, Ts is the target braking occasion, Fs is a preset minimum safety parameter with a value range [1, 1.5]. In this way, different braking time parameters can be obtained for different driving habits, so as to effectively adapt to drivers of particular personalities.

It should be noted that, as regards how a collision warning apparatus obtains the braking time parameter in this application, refer to the foregoing description about how the collision warning apparatus obtains the target deceleration and the target distance headway of the first vehicle. In one embodiment, the collision warning apparatus may train the historical travel data of the first vehicle beforehand to obtain the target braking cycle and the target braking occasion, and further obtain and store the braking time parameter; and may update the target braking cycle and the target braking occasion at set intervals, and further update the braking time parameter. In this case, the collision warning apparatus can directly obtain the stored braking time parameter (that is, the braking time parameter obtained through updating in a previous cycle).

Figures 1, 9A:
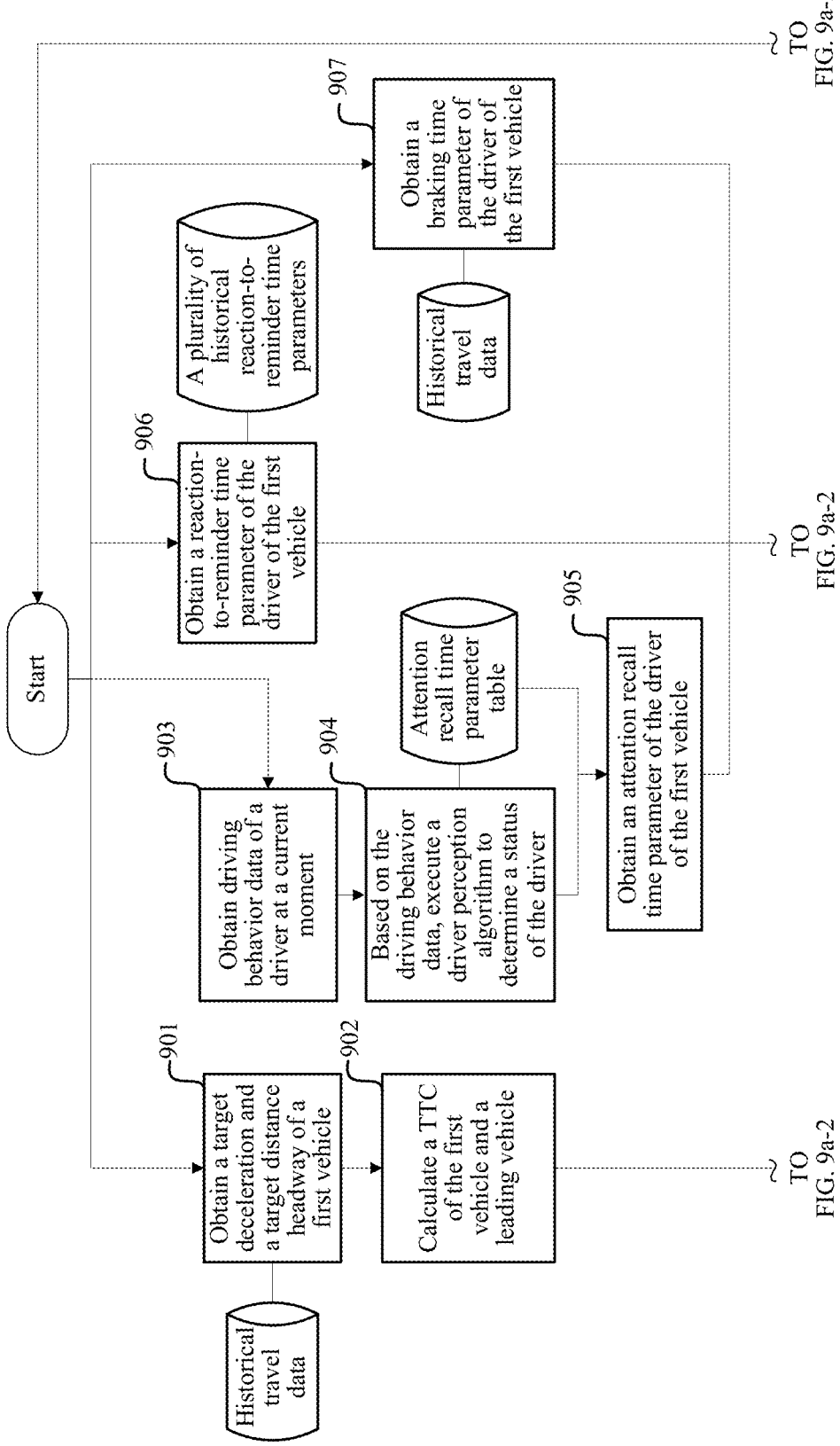
Figures 2, 9A:
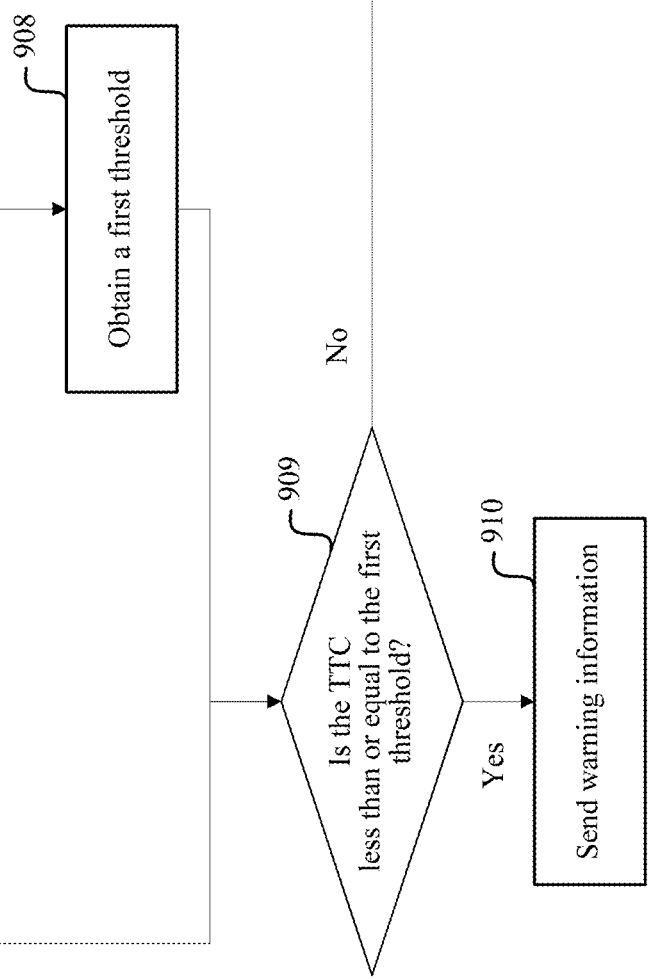

For clearer description of the collision warning method, the method is further detailed below with reference to FIG. 9a-1 and FIG. 9a-2. FIG. 9a-1 and FIG. 9a-2 are a schematic flowchart of overall implementation of a collision warning method according to this application. As shown in FIG. 9a-1 and FIG. 9a-2, the method includes:

Operation 901: Obtain a target deceleration and a target distance headway of a first vehicle that are obtained beforehand through training;

Operation 902: Calculate a TTC of a first vehicle and a leading vehicle;

Operation 903: Obtain driving behavior data of a driver at a current moment, where the driving behavior data includes a limb behavior, a facial expression, or line-of-sight orientation information or the like of the driver;

Operation 904: Based on the driving behavior data, execute a driver perception algorithm to determine a status of the driver;

Operation 905: Obtain an attention recall time parameter of the driver based on the status of the driver and an attention recall time parameter table;

Operation 906: Obtain a reaction-to-reminder time parameter of the driver of the first vehicle, where the parameter is determined beforehand through an iteration process;

Operation 907: Obtain a braking time parameter of the driver of the first vehicle, where the parameter is obtained beforehand through training;

Operation 908: Sum up the attention recall time parameter and the braking time parameter of the driver of the first vehicle to obtain the first threshold;

Operation 909: Determine whether the TTC is less than or equal to the first threshold. If the TTC is less than or equal to the first threshold, perform operation 910; if the TTC is greater than the first threshold, perform a next collision warning process; and Operation 910: Send warning information.

It should be noted that numbers of the foregoing operations are merely illustrative for an execution process. The embodiments of this application do not explicitly restrict order of the operations, and some operations may be performed simultaneously (for example, operation 906 and operation 907 may be performed simultaneously), or performed in order different from the order indicated by the foregoing numbers.

The foregoing content gives a detailed description of a collision warning process. In this application, when it is determined in the foregoing collision warning process that warning information needs to be sent, warning intensity and a warning mode for sending the warning information may be further determined. In this way, the warning can be diversified, and user experience can be effectively improved. The following gives a detailed description of the warning intensity and the warning mode for sending the warning information.

(1) Warning Intensity

The collision warning apparatus may, based on a TTC value, determine the warning intensity for sending the warning information. In one embodiment, as shown in FIG. 7, if the collision warning apparatus determines that the TTC value is greater than a first threshold, that is, TTC □ (T3+T2+T1), ∞), it indicates that there is still a long time before a collision, and no warning needs to be raised currently. If it is determined that the TTC value is greater than the sum of the reaction-to-reminder time parameter and the braking time parameter and less than or equal to the first threshold, that is, TTC □ (T3+T2, T3+T2+T1], then the warning information is sent at a first warning level. If it is determined that the TTC value is greater than the braking time parameter and less than or equal to the sum of the reaction-to-reminder time parameter and the braking time parameter, that is, TTC □ (T3, T3+T2], then the warning information is sent at a second warning level. The warning intensity of the first warning level is less than that of the second warning level. If it is determined that the TTC value is less than the braking time parameter, that is, TTC □ (0, T3], no more warning is raised. When TTC is equal to $T_{AEB}$, an AEB system is started for intervention.

In this way, intensity of warning is determined based on a TTC value. If the TTC value is relatively small, it indicates relatively high urgency, and therefore, a relatively high intensity of warning may be used to remind the driver to take a braking action to avoid a collision effectively.

(2) Warning Mode

The collision warning apparatus may determine the warning mode based on the status of the driver (attention type and attention level) and/or line-of-sight orientation information of the driver.

In one embodiment, the attention type of the driver is obtained (for details, refer to the manner of obtaining the attention type described in the foregoing description of the attention recall time parameter, and details are not described herein again), and it is determined whether the driver is in a fatigued state. If the driver is in a fatigued state, the driver may defocus a line of sight due to fatigue, and an enhanced warning mode such as a vibration mode may be applied to effectively wake up the driver. If the driver is not in a fatigued state, a normal warning mode may be applied.

It is determined whether the line of sight of the driver is right ahead. If the line of sight of the driver is right ahead, a normal visual warning will have a good effect, and therefore, a normal warning mode may be applied. If the line of sight of the driver is not right ahead, the line of sight of the driver needs to be pulled back to a direction right ahead, and therefore, an enhanced display mode may be applied, for example, displaying red or blinking. Further, a sound mode may be applied to enhance the warning.

In this application, a basis for determining the warning mode may be only the status of the driver, or only the line-of-sight orientation information, or a combination of the status of the driver and the line-of-sight orientation information, so that the warning mode better meets user needs. For the determining of the warning mode in the case, refer to Table 4.

TABLE 4

Determining a warning mode

| Is the driver in an attentive state? | Is the line of sight right ahead? | Warning mode |
|---|---|---|
| Yes | Yes | Normal display mode<br>Vibration mode for warning enhancement |
| Yes | No | Enhanced display mode<br>Vibration mode for warning enhancement<br>Sound mode for warning enhancement |
| No | Yes | Normal display mode |
| No | No | Enhanced display mode<br>Sound mode for warning enhancement |

It should be noted that, in this application, the method for determining the warning intensity and the warning mode for sending the warning information may be used together with the collision warning process described above, or may be used separately. This is not limited herein.

Figure 9B:
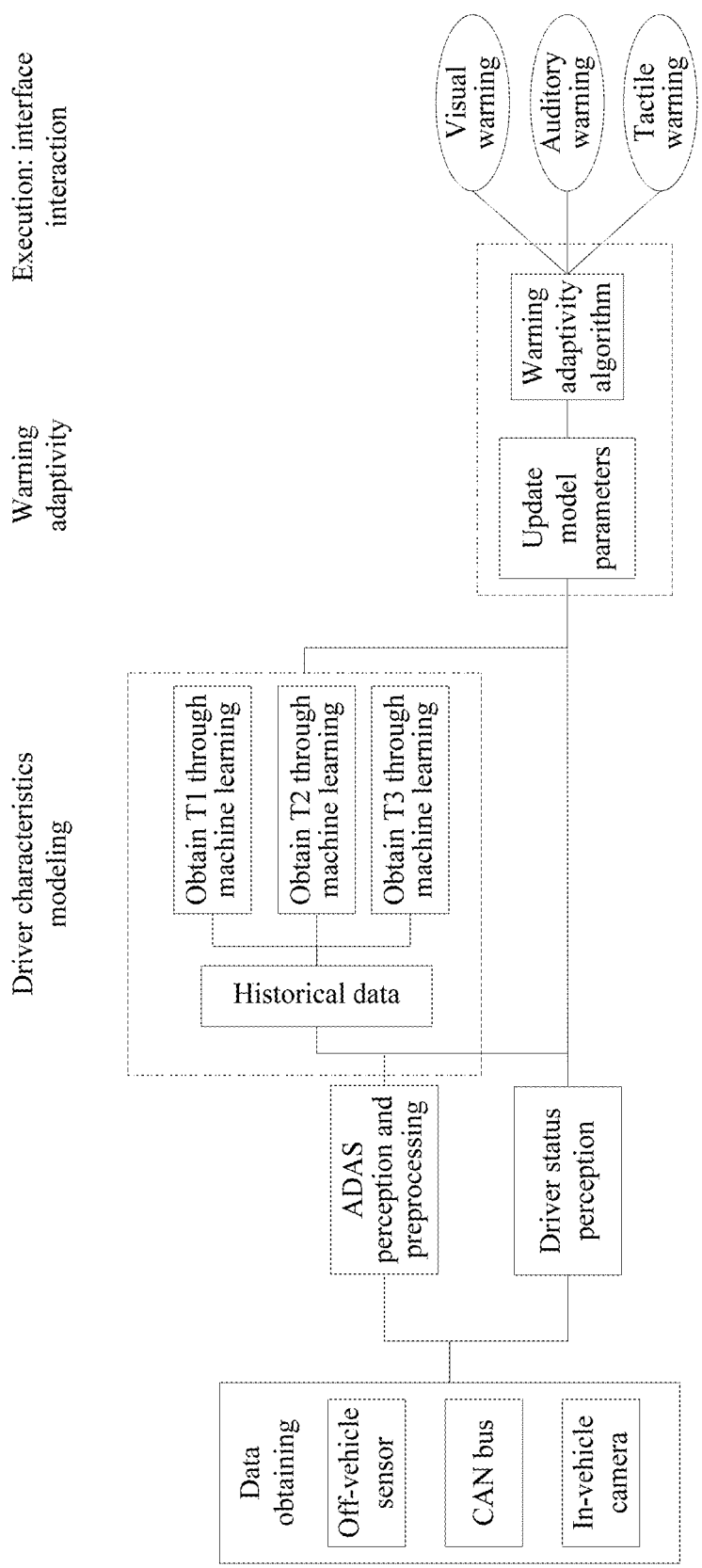
FIG. 9b is a schematic diagram of overall implementation of a collision warning method according to this application.

Based on the foregoing description, FIG. 9b illustrates an overall implementation of a collision warning method according to this application. For an implementation process of FIG. 9b, refer to the foregoing content, and the following gives only a brief description. As shown in FIG. 9b, an off-vehicle sensor, a CAN bus, an in-vehicle camera, and the like may be used to obtain data. Based on the obtained data, driving status is perceived, and an advanced driving assisted system (ADAS) performs perception and preprocessing. In a driver characteristic modeling part, obtaining T1 through machine learning, obtaining T2 through machine learning, and obtaining T3 through machine learning correspond to the foregoing descriptions about T1, T2, T3, respectively. Further, model parameters (T1, T2, T3) are updated, and the warning intensity and the warning mode are determined by executing a warning adaptivity algorithm. Visual warning corresponds to the display mode warning in the foregoing description, an auditory warning corresponds to the sound mode warning in the foregoing description, and a tactile warning corresponds to the vibration mode warning in the foregoing description.

In the collision warning method according to this application, a target deceleration and a target distance headway of a first vehicle are obtained through training based on historical travel data of the first vehicle (a subject vehicle), a TTC of the first vehicle and a leading vehicle is obtained, and whether to send warning information is determined based on a comparison between the TTC and the first threshold. Because the target deceleration and the target distance headway of the first vehicle can reflect personal driving habit characteristics of a driver of the first vehicle, the TTC obtained based on the historical travel data is highly adaptable, thereby effectively resolving the technical problem of low warning effectiveness that is caused by a unified deceleration and a unified distance headway in the prior art. Further, the first threshold may be obtained based on a sum of the attention recall time parameter, the reaction-to-reminder time parameter, and the braking time parameter of the driver of the first vehicle. The three time parameters comprehensively cover an entire stage from receiving a warning to completing braking by the driver. Therefore, the first threshold is obtained based on the three time parameters, and the TTC is compared with the first threshold to determine whether to trigger a warning. In this way, warning service can be provided to the driver more accurately, and reasonableness and effectiveness of the warning are fully ensured.

Corresponding to the foregoing method process, this application provides a collision warning apparatus. For an implementation of the collision warning apparatus, refer to the foregoing method process.

Figure 10:
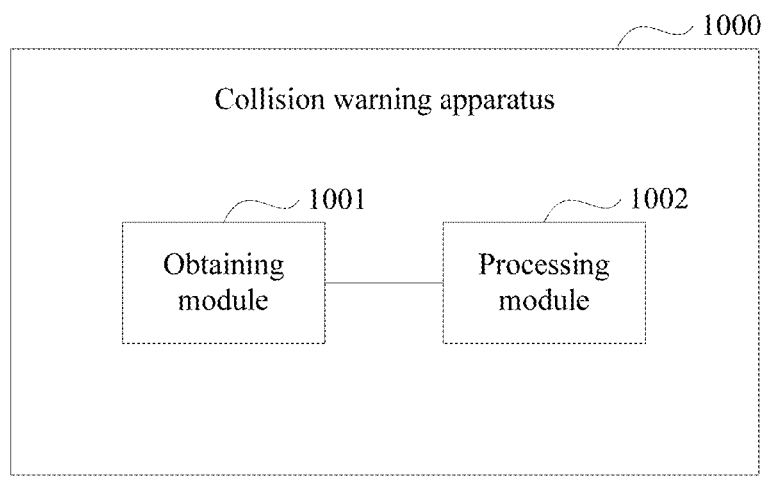
FIG. 10 is a schematic structural diagram of a collision warning apparatus according to this application.

Based on the same concept, FIG. 10 is a schematic structural diagram of a collision warning apparatus according to this application. The collision warning apparatus is configured to implement corresponding processes or operations in the method embodiment shown in FIG. 3, FIG. 9a-1 and FIG. 9a-2 or the like, and the collision warning apparatus 1000 includes:

an obtaining module 1001, configured to obtain a target deceleration and a target distance headway of a first vehicle, where the target deceleration and the target distance headway of the first vehicle are obtained through training based on historical travel data of the first vehicle, and the historical travel data of the first vehicle includes decelerations in a plurality of braking processes and distance headways of the first vehicle that correspond to a plurality of braking end moments; and a processing module 1002, configured to obtain a time to collision TTC of the first vehicle and a leading vehicle based on the target deceleration and the target distance headway; and send warning information if it is determined that the TTC is less than or equal to a first threshold.

In one embodiment, the processing module 1002 is configured to obtain the TTC of the first vehicle and the leading vehicle by using the formula 1, formula 2, and formula 3 above.

In one embodiment, before determining that the TTC is less than or equal to the first threshold, the processing module 1002 is further configured to:

obtain the first threshold based on any one or any combination of an attention recall time parameter, a reaction-to-reminder time parameter, and a braking time parameter of a driver of the first vehicle, where the attention recall time parameter of the driver of the first vehicle means a time required for engaging attention of the driver back from a preset state of the driver, where the preset state includes an inattentive state;

the reaction-to-reminder time parameter of the driver of the first vehicle means a time required for the driver to react after the warning information is sent when the driver has paid attention; and the braking time parameter of the driver of the first vehicle means a time required for the first vehicle to restore a safe state after the driver takes a braking action.

In one embodiment, the processing module 1002 obtains the attention recall time parameter of the driver of the first vehicle in the following way:

obtaining driving behavior data of the driver at a current moment, where the driving behavior data includes any one or any combination of a limb behavior, a facial expression, and line-of-sight orientation information of the driver; and obtaining the attention recall time parameter of the driver of the first vehicle based on the driving behavior data.

In one embodiment, The processing module 1002 is configured to:

determine a status of the driver based on the driving behavior data, and obtain, based on the status of the driver and a correspondence between the status and the attention recall time parameter, the attention recall time parameter corresponding to the status of the driver.

In one embodiment, the correspondence between the status and the attention recall time parameter is obtained through machine learning based on prepared historical driving behavior data and historical attention recall time parameters of a plurality of drivers.

In one embodiment, the historical travel data of the first vehicle further includes a plurality of historical reaction-to-reminder time parameters of the driver of the first vehicle;

the processing module 1002 is configured to obtain the reaction-to-reminder time parameter of the driver of the first vehicle in the following way:

obtaining the reaction-to-reminder time parameter of the driver of the first vehicle based on the plurality of historical reaction-to-reminder time parameters.

In one embodiment, The processing module 1002 is configured to:

obtain the reaction-to-reminder time parameter of the driver of the first vehicle in an iteration manner based on the plurality of historical reaction-to-reminder time parameters, where the iteration manner is: determining a deviation between a reaction-to-reminder time parameter obtained in a previous iteration and a reaction-to-reminder time parameter for a current iteration, and updating the reaction-to-reminder time parameter to a reaction-to-reminder time for the current iteration and performing a next iteration, if a deviation rate is greater than a deviation rate threshold, or ending the iterations and obtaining the reaction-to-reminder time parameter of the driver of the first vehicle, if a deviation rate is less than or equal to the deviation rate threshold, where the reaction-to-reminder time parameter for each iteration is obtained based on at least one historical reaction-to-reminder time parameter.

In one embodiment, the historical travel data further includes a plurality of braking start moments, a plurality of braking end moments corresponding to the plurality of braking start moments, and TTC values of the plurality of braking start moments;

the processing module 1002 is configured to obtain the braking time parameter of the driver of the first vehicle in the following way:

obtaining a plurality of braking cycles and braking occasions based on the historical travel data, where each of the braking cycles is a time length from a braking start moment to a braking end moment, and each of the braking occasions is a TTC corresponding to a braking start moment; and obtaining a target braking cycle and a target braking occasion based on the plurality of braking cycles and braking occasions, and obtaining the braking time parameter of the driver of the first vehicle based on the target braking cycle and the target braking occasion.

In one embodiment, the processing module 1002 is configured to obtain the braking time parameter of the driver of the first vehicle by using the following formula:

$$T3=Tb*Fs+Ts$$

where T3 is the braking time parameter of the driver of the first vehicle, Tb is the target braking cycle, Ts is the target braking occasion, and Fs is a preset safety parameter.

In one embodiment, the processing module 1002 is configured to:

sum up the attention recall time parameter and the braking time parameter of the driver of the first vehicle to obtain the first threshold.

In one embodiment, the processing module 1002 is configured to:

send the warning information at a first warning level if it is determined that the TTC is greater than a sum of the reaction-to-reminder time parameter and the braking time parameter and is less than or equal to the first threshold; or send the warning information at a second warning level if it is determined that the TTC is greater than the braking time parameter and is less than or equal to a sum of the reaction-to-reminder time parameter and the braking time parameter, where the first warning level is lower than the second warning level in intensity of warning.

In one embodiment, before sending the warning information, the processing module 1002 is further configured to:

determine the status of the driver of the first vehicle and/or the line-of-sight orientation information of the driver, and determine, based on the status of the driver of the first vehicle and/or the line-of-sight orientation information of the driver, a manner of sending the warning information.

In one embodiment, the processing module 1002 is configured to:

determine, if it is determined that the driver of the first vehicle is in a fatigued state, that the manner of sending the warning information is a vibration mode; and/or determine, if it is determined that the line-of-sight orientation information of the driver indicates a direction other than a right-ahead direction, that the manner of sending the warning information is a voice mode and/or an enhanced display mode.

In one embodiment, the processing module 1002 is configured to obtain the target deceleration of the first vehicle by training in the following way:

selecting, among decelerations in a plurality of braking processes, a deceleration greater than a first threshold and less than a second threshold, and obtaining the target deceleration based on the selected deceleration; and the target distance headway of the first vehicle is obtained through training in the following way:

selecting, among distance headways of the first vehicle that correspond to the plurality of braking end moments, a distance headway greater than a third threshold and less than a fourth threshold, and obtaining the target distance headway based on the selected distance headway.

It should be noted that, in this embodiment of this application, module division is an example, and is merely a logical function division. In actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 11:
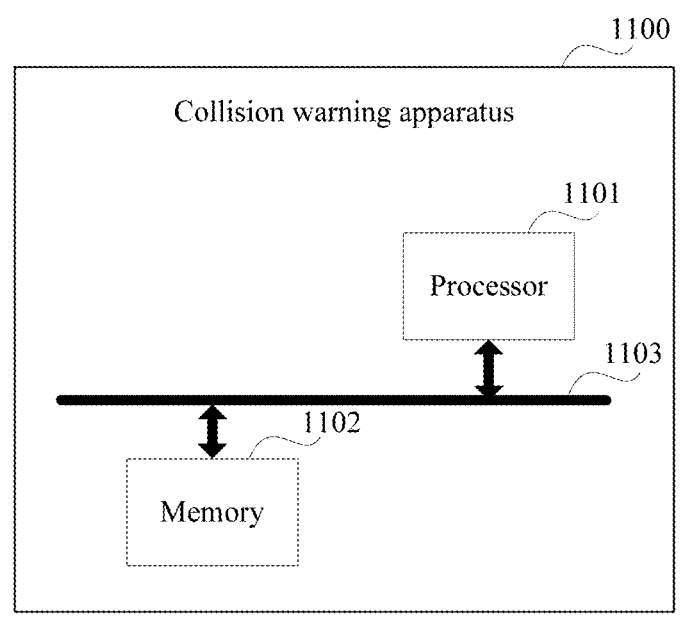
FIG. 11 is a schematic structural diagram of another collision warning apparatus according to this application.

Based on the same concept, FIG. 11 is a schematic structural diagram of another collision warning apparatus according to this application. The collision warning apparatus is configured to implement corresponding processes or operations in the method embodiment shown in FIG. 3, FIG. 9a-1 and FIG. 9a-2 or the like, and the collision warning apparatus 1100 includes: a processor 1101 and a memory 1102. The memory 1102 stores a computer program. In one embodiment, the program may include program code, and the program code includes an instruction. The memory 1102 may include a RAM, and may also include a non-volatile memory such as at least one disk memory. When the processor 1101 reads and executes the computer program stored in the memory 1102, the collision warning apparatus 1100 is enabled to implement the collision warning method provided in any one of the foregoing designs.

In one embodiment, the processor 1101 and the memory 1102 may be connected to each other by using a bus 1103. The bus 1103 may be a peripheral component interconnect (PCI) bus, an extended industry standard architecture (EISA) bus, or the like. The bus 1103 may be classified into an address bus, a data bus, a control bus, and the like.

A person skilled in the art should understand that the embodiments of the present application may be provided as a method, a system, or a computer program product. Therefore, the embodiments of the present application may use a form of hardware only embodiments, software only embodiments, or embodiments with a combination of software and hardware. Moreover, the embodiments of the present application may use a form of a computer program product that is implemented on one or more computer-usable storage media (including but not limited to a disk memory, a CD-ROM, an optical memory, and the like) that include computer-usable program code.

The embodiments of the present application are described with reference to the flowcharts and/or block diagrams of the method, the device, system, and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer readable memory that can instruct the computer or any other programmable data processing device to work in a manner, so that the instructions stored in the computer readable memory generate an artifact that includes an instruction apparatus. The instruction apparatus implements a function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a function in one or more processes in the flowcharts and/or in one or more blocks in the block diagrams.

Obviously, a person skilled in the art can make various modifications and variations to embodiments of the present application without departing from the spirit and scope of this application. This application is intended to cover these modifications and variations provided that they fall within the scope of protection defined by the following claims and their equivalent technologies.

We claim:

1. A collision warning method for use for a vehicle implemented by a processor and a memory to store instructions, the processor configured to execute the instructions to perform the operations of the collision warning method, the collision warning method comprising:
    obtaining a target deceleration and a target distance headway of a first vehicle, by the processor, wherein the target deceleration and the target distance headway of the first vehicle are obtained through training based on historical travel data of the first vehicle, and the historical travel data of the first vehicle comprises decelerations in a plurality of braking processes and distance headways of the first vehicle corresponding to a plurality of braking end moments;
    obtaining, by the processor, a time to collision (TTC) of the first vehicle and a leading vehicle based on the target deceleration and the target distance headway; and
    sending, by the processor, warning information if it is determined that the TTC is less than or equal to a first threshold, wherein before it is determined that the TTC is less than or equal to the first threshold, the processor obtains the first threshold based on any one or any combination of an attention recall time parameter, a reaction-to-reminder time parameter, and a braking time parameter of a driver of the first vehicle.

2. The method according to claim 1, wherein the TTC of the first vehicle and the leading vehicle is obtained by using the following formulas:

$$\Delta v = Vh - Vd$$

$$\Delta a = ah - ad$$

wherein $\Delta t$ is the TTC of the first vehicle and the leading vehicle, D is an inter-vehicle distance between the first vehicle and the leading vehicle, DHW is the target distance headway of the first vehicle, $\Delta v$ is a relative speed of the first vehicle against the leading vehicle, Vh is a travel speed of the first vehicle, Vd is a travel speed of the leading vehicle, $\Delta a$ is a braking deceleration of the first vehicle against the leading vehicle, ah is the target deceleration of the first vehicle, and ad is a target deceleration of the leading vehicle.

3. The method according to claim 1, wherein:
    the attention recall time parameter of the driver of the first vehicle includes a time required for engaging attention of the driver back from a preset state of the driver, wherein the preset state comprises an inattentive state;

the reaction-to-reminder time parameter of the driver of the first vehicle includes a time required for the driver to react after the warning information is sent when the driver has paid attention; and the braking time parameter of the driver of the first vehicle includes a time required for the first vehicle to restore a safe state after the driver takes a braking action.

4. The method according to claim 3, wherein the attention recall time parameter of the driver of the first vehicle is obtained by:

obtaining driving behavior data of the driver at a current moment, wherein the driving behavior data comprises any one or any combination of a limb behavior, a facial expression, and line-of-sight orientation information of the driver; and obtaining the attention recall time parameter of the driver of the first vehicle based on the driving behavior data.

5. The method according to claim 3, wherein the historical travel data of the first vehicle further comprises a plurality of historical reaction-to-reminder time parameters of the driver of the first vehicle;

the reaction-to-reminder time parameter of the driver of the first vehicle obtained by:

obtaining the reaction-to-reminder time parameter of the driver of the first vehicle based on the plurality of historical reaction-to-reminder time parameters.

6. The method according to claim 5, wherein the obtaining the reaction-to-reminder time parameter of the driver of the first vehicle based on the plurality of historical reaction-to-reminder time parameters comprises:

obtaining the reaction-to-reminder time parameter of the driver of the first vehicle in an iteration manner based on the plurality of historical reaction-to-reminder time parameters, wherein the iteration manner includes: determining a deviation between a reaction-to-reminder time parameter obtained in a previous iteration and a reaction-to-reminder time parameter for a current iteration, and updating the reaction-to-reminder time parameter to a reaction-to-reminder time for the current iteration and performing a next iteration, if a deviation rate is greater than a deviation rate threshold, or ending the iterations and obtaining the reaction-to-reminder time parameter of the driver of the first vehicle, if a deviation rate is less than or equal to the deviation rate threshold, wherein the reaction-to-reminder time parameter for each iteration is obtained based on at least one historical reaction-to-reminder time parameter.

7. The method according to claim 3, wherein the historical travel data further comprises a plurality of braking start moments, a plurality of braking end moments corresponding to the plurality of braking start moments, and TTC values of the plurality of braking start moments;

the braking time parameter of the driver of the first vehicle is obtained by:

obtaining a plurality of braking cycles and braking occasions based on the historical travel data, wherein each of the braking cycles is a time length from a braking start moment to a braking end moment, and each of the braking occasions is a TTC corresponding to a braking start moment; and obtaining a target braking cycle and a target braking occasion based on the plurality of braking cycles and braking occasions, and obtaining the braking time parameter of the driver of the first vehicle based on the target braking cycle and the target braking occasion.

8. The method according to claim 7, wherein the braking time parameter of the driver of the first vehicle is obtained by using the following formula:

$$T3 = Tb*Fs + Ts$$

wherein T3 is the braking time parameter of the driver of the first vehicle, Tb is the target braking cycle, Ts is the target braking occasion, and Fs is a preset safety parameter.

9. The method according to claim 3, wherein the obtaining the first threshold based on any one or any combination of an attention recall time parameter, a reaction-to-reminder time parameter, and a braking time parameter of a driver of the first vehicle comprises:

summing up the attention recall time parameter, the reaction-to-reminder time parameter, and the braking time parameter of the driver of the first vehicle to obtain the first threshold.

10. The method according to claim 1, wherein before the sending warning information, the method further comprises:

determining the status of the driver of the first vehicle and/or the line-of-sight orientation information of the driver, and determining, based on the status of the driver of the first vehicle and/or the line-of-sight orientation information of the driver, a manner of sending the warning information.

11. A collision warning apparatus for use for a vehicle comprising:

a memory to store instructions;

a processor configured to execute the instructions to perform operations including:

obtaining a target deceleration and a target distance headway of a first vehicle, wherein the target deceleration and the target distance headway of the first vehicle are obtained through training based on historical travel data of the first vehicle, and the historical travel data of the first vehicle comprises decelerations in a plurality of braking processes and distance headways of the first vehicle corresponding to a plurality of braking end moments; and obtaining a time to collision (TTC) of the first vehicle and a leading vehicle based on the target deceleration and the target distance headway, and sending warning information if it is determined that the TTC is less than or equal to a first threshold, wherein before it is determined that the TTC is less than or equal to the first threshold, the processor obtain the first threshold based on any one or any combination of an attention recall time parameter, a reaction-to-reminder time parameter, and a braking time parameter of a driver of the first vehicle.

12. The collision warning apparatus according to claim 11, wherein the processor is configured to obtain the TTC of the first vehicle and the leading vehicle by using the following formulas:

$$\Delta v = Vh - Vd$$

$$\Delta a = ah - ad$$

wherein $\Delta t$ is the TTC of the first vehicle and the leading vehicle, D is an inter-vehicle distance between the first vehicle and the leading vehicle, DHW is the target distance headway of the first vehicle, $\Delta v$ is a relative speed of the first vehicle against the leading vehicle, Vh is a travel speed of the first vehicle, Vd is a travel speed of the leading vehicle, $\Delta a$ is a braking deceleration of the first vehicle against the leading vehicle, ah is the target deceleration of the first vehicle, and ad is a target deceleration of the leading vehicle.

13. The collision warning apparatus according to claim 11, wherein:

the attention recall time parameter of the driver of the first vehicle includes a time required for engaging attention of the driver back from a preset state of the driver, wherein the preset state comprises an inattentive state;

the reaction-to-reminder time parameter of the driver of the first vehicle includes a time required for the driver to react after the warning information is sent when the driver has paid attention; and the braking time parameter of the driver of the first vehicle includes a time required for the first vehicle to restore a safe state after the driver takes a braking action.

14. The collision warning apparatus according to claim 13, wherein the processor obtains the attention recall time parameter of the driver of the first vehicle by:

obtaining driving behavior data of the driver at a current moment, wherein the driving behavior data comprises any one or any combination of a limb behavior, a facial expression, and line-of-sight orientation information of the driver; and obtaining the attention recall time parameter of the driver of the first vehicle based on the driving behavior data.

15. The collision warning apparatus according to claim 13, wherein the historical travel data of the first vehicle further comprises a plurality of historical reaction-to-reminder time parameters of the driver of the first vehicle;

the processor is configured to obtain the reaction-to-reminder time parameter of the driver of the first vehicle by:

obtaining the reaction-to-reminder time parameter of the driver of the first vehicle based on the plurality of historical reaction-to-reminder time parameters.

16. The collision warning apparatus according to claim 15, wherein the processor is configured to:

obtain the reaction-to-reminder time parameter of the driver of the first vehicle in an iteration manner based on the plurality of historical reaction-to-reminder time parameters, wherein the iteration manner includes: determining a deviation between a reaction-to-reminder time parameter obtained in a previous iteration and a reaction-to-reminder time parameter for a current iteration, and updating the reaction-to-reminder time parameter to a reaction-to-reminder time for the current iteration and performing a next iteration, if a deviation rate is greater than a deviation rate threshold, or ending the iterations and obtaining the reaction-to-reminder time parameter of the driver of the first vehicle, if a deviation rate is less than or equal to the deviation rate threshold, wherein the reaction-to-reminder time parameter for each iteration is obtained based on at least one historical reaction-to-reminder time parameter.

17. The collision warning apparatus according to claim 13, wherein the historical travel data further comprises a plurality of braking start moments, a plurality of braking end moments corresponding to the plurality of braking start moments, and TTC values of the plurality of braking start moments;

the processor is configured to obtain the braking time parameter of the driver of the first vehicle by:

obtaining a plurality of braking cycles and braking occasions based on the historical travel data, wherein each of the braking cycles is a time length from a braking start moment to a braking end moment, and each of the braking occasions is a TTC corresponding to a braking start moment; and obtaining a target braking cycle and a target braking occasion based on the plurality of braking cycles and braking occasions, and obtaining the braking time parameter of the driver of the first vehicle based on the target braking cycle and the target braking occasion.

18. The collision warning apparatus according to claim 17, wherein the processor is configured to obtain the braking time parameter of the driver of the first vehicle by using the following formula:

$$T3=Tb*Fs+Ts$$

wherein T3 is the braking time parameter of the driver of the first vehicle, Tb is the target braking cycle, Ts is the target braking occasion, and Fs is a preset safety parameter.

19. The collision warning apparatus according to claim 18, wherein the processor is configured to:

sum up the attention recall time parameter and the braking time parameter of the driver of the first vehicle to obtain the first threshold.

20. The collision warning apparatus according to claim 11, wherein before sending the warning information, the processor is further configured to:

determine the status of the driver of the first vehicle and/or the line-of-sight orientation information of the driver, and determine, based on the status of the driver of the first vehicle and/or the line-of-sight orientation information of the driver, a manner of sending the warning information.

* * * * *